(12) United States Patent  
Gehring

(10) Patent No.: US 10,422,311 B2  
(45) Date of Patent: Sep. 24, 2019

(54) HYDROELECTRICITY GENERATING UNIT CAPTURING MARINE CURRENT ENERGY

(71) Applicant: Donald Hollis Gehring, Houston, TX (US)

(72) Inventor: Donald Hollis Gehring, Houston, TX (US)

( * ) Notice: Subject to any disclaimer, the term of this patent is extended or adjusted under 35 U.S.C. 154(b) by 0 days.

(21) Appl. No.: 15/997,517

(22) Filed: Jun. 4, 2018

(65) Prior Publication Data

US 2018/0347538 A1 Dec. 6, 2018

Related U.S. Application Data

(60) Provisional application No. 62/514,625, filed on Jun. 2, 2017.

(51) Int. Cl.

| | |
|---|---|
| *F03B 7/00* | (2006.01) |
| *F03B 13/00* | (2006.01) |
| *H02K 7/18* | (2006.01) |
| *F03B 17/06* | (2006.01) |
| *B63B 35/44* | (2006.01) |
| *B63B 21/50* | (2006.01) |

(52) U.S. Cl.
CPC ............. *F03B 7/00* (2013.01); *B63B 35/44* (2013.01); *F03B 13/00* (2013.01); *F03B 17/063* (2013.01); *H02K 7/1823* (2013.01); *B63B 21/50* (2013.01); *B63B 2035/4466* (2013.01); *F05B 2240/40* (2013.01); *F05B 2240/932* (2013.01)

(58) Field of Classification Search
USPC .................. 290/42, 43, 53, 54; 415/7; 440/3
See application file for complete search history.

(56) References Cited

U.S. PATENT DOCUMENTS

| | | | | |
|---|---|---|---|---|
| 3,986,787 A | * | 10/1976 | Mouton, Jr. ............ | F03B 11/02 415/7 |
| 4,239,976 A | * | 12/1980 | Collard ................. | F03B 17/063 290/42 |
| 4,598,210 A | * | 7/1986 | Biscomb ............... | F03B 17/063 290/43 |

(Continued)

FOREIGN PATENT DOCUMENTS

| | | |
|---|---|---|
| CN | 104564504 | 8/2016 |
| JP | 5875722 | 3/2016 |

(Continued)

*Primary Examiner* — Pedro J Cuevas

(57) ABSTRACT

A hydroelectricity generating unit capturing marine current energy includes a floating hull, at least one paddle wheel assembly, at least one generator assembly, a torque transmission system, and an anti-drift mooring system. The at least one paddle wheel assembly is rotatably mounted to the floating hull and operatively coupled with the at least one generator assembly by the torque transmission system, wherein a kinetic energy of the at least one paddle wheel assembly is transferred to the at least one generator assembly by the torque transmission system to generate hydroelectricity. The torque transmission system can be a hydraulic system, a pulley system, a multiple gearbox system, or a direct driveshaft. The floating hull is tensionably coupled to a subsurface environment by the anti-drift mooring system, enabling the least one paddle wheel assembly to capture water current.

26 Claims, 20 Drawing Sheets

(56) References Cited

U.S. PATENT DOCUMENTS

| | | | | |
|---|---|---|---|---|
| 4,725,195 A * | 2/1988 | Wiggs | ............... | F03B 17/063 |
| | | | | 415/121.2 |
| 5,187,978 A * | 2/1993 | Tendler | ............... | G01C 21/10 |
| | | | | 701/408 |
| 6,616,403 B1 * | 9/2003 | Smith | ............... | F03B 17/063 |
| | | | | 415/124.1 |
| 7,042,113 B2 * | 5/2006 | Aukon | ............... | H02K 7/1823 |
| | | | | 290/43 |
| 7,063,579 B2 * | 6/2006 | Voves | ............... | B63B 35/44 |
| | | | | 290/54 |
| 7,105,942 B2 * | 9/2006 | Henriksen | ............... | B63B 35/44 |
| | | | | 290/55 |
| 7,223,137 B1 * | 5/2007 | Sosnowski | ............... | B63B 35/44 |
| | | | | 290/54 |
| 7,315,092 B2 * | 1/2008 | Cook | ............... | F03B 13/20 |
| | | | | 290/42 |
| 8,102,068 B1 * | 1/2012 | Gutekunst | ............... | F03B 17/063 |
| | | | | 290/42 |
| 8,197,180 B1 * | 6/2012 | Lamp | ............... | F03B 13/10 |
| | | | | 415/7 |
| 8,446,032 B2 * | 5/2013 | Chauvin | ............... | F03B 17/063 |
| | | | | 290/54 |
| 8,573,890 B2 | 11/2013 | Gehring | | |
| 8,692,404 B2 * | 4/2014 | Chauvin | ............... | F03B 17/063 |
| | | | | 290/54 |
| 8,823,196 B1 | 9/2014 | Gehring | | |
| 8,878,381 B2 * | 11/2014 | Henry | ............... | F03B 13/264 |
| | | | | 290/53 |
| 8,912,677 B2 * | 12/2014 | Dehlsen | ............... | E02B 9/08 |
| | | | | 290/53 |
| 8,956,103 B2 | 2/2015 | Gehring | | |
| 8,957,541 B1 * | 2/2015 | Jacobsen | ............... | F03B 13/00 |
| | | | | 290/54 |
| 9,234,492 B2 * | 1/2016 | Dunne | ............... | E02D 15/08 |
| 9,581,127 B2 * | 2/2017 | Van Rompay | ............... | F03B 11/02 |
| 9,587,620 B2 * | 3/2017 | Rhinefrank | ............... | F03B 13/14 |
| 10,100,803 B1 * | 10/2018 | Alvarado | ............... | F03B 13/22 |
| 2006/0208494 A1 | 9/2006 | Cook | ............... | F03B 13/20 |
| | | | | 290/53 |
| 2011/0304144 A1 * | 12/2011 | Dehlsen | ............... | E02B 9/08 |
| | | | | 290/53 |
| 2012/0086207 A1 * | 4/2012 | Gray | ............... | F03B 17/063 |
| | | | | 290/54 |
| 2013/0313831 A1 * | 11/2013 | Gehring | ............... | F03B 13/10 |
| | | | | 290/54 |
| 2015/0252777 A1 * | 9/2015 | Rhinefrank | ............... | F03B 13/14 |
| | | | | 290/53 |
| 2017/0058859 A1 * | 3/2017 | Konstantinov | ............... | F03B 17/067 |

FOREIGN PATENT DOCUMENTS

| | | |
|---|---|---|
| KR | 10-1543995 | 8/2015 |
| TW | I500556 | 9/2015 |

* cited by examiner

HYDROELECTRICITY GENERATING UNIT CAPTURING MARINE CURRENT ENERGY

The current application claims a priority to the U.S. Provisional Patent application Ser. No. 62/514,625 filed on Jun. 2, 2017. The current application is filed on Jun. 4, 2018 while Jun. 2, 2018 was on a weekend.

FIELD OF THE INVENTION

The present invention relates generally to power generation, and more specifically to pontoon barges that support one or more paddlewheels turned by water currents to generate power.

BACKGROUND OF THE INVENTION

As technology and industry in the modern world continues to grow and expand, so do the power requirements. Many different sources of power generation exist today involving: fossil fuel burning, solar, wind, geothermal, hydroelectric, wave and current power generation, etc. Hydroelectric, wave and current power generation use the movement of water to generate power. The majority of the planet is covered in water, most of which is constantly moving. This moving water power is harnessed and converted to electrical energy through apparatuses which take advantage of the electromagnetic phenomenon known as Faraday's law, which states that an electromotive force is produced by moving an electrical conductor through a magnetic field. Essentially, moving water is free energy waiting to be captured and utilized. Hydroelectric generation accounts for over 20 percent of the world's electricity generation, mostly from dams such as the Hoover Dam, which utilize the gravitational high pressure and force of falling water to generate electricity. Hydroelectricity is a valuable source of energy since it is renewable; it has a low cost when produced from an existing dam and an existing reservoir and power generation facility. It produces no pollution which is the case with burning hydrocarbons. However, power from new hydroelectric construction projects is not as cost effective as from existing facilities and much more time consuming especially regarding the permitting process to flood new areas for reservoirs. A study funded by the European Commission found that hydroelectricity produces the least amount of greenhouse gases and externalities.

Another method of hydroelectric generation is to utilize the movement of non-reservoir river current, tidal estuary current, and marine current. Marine currents are driven by the tides, wind, solar heating, and occasionally variations in water density and salinity. Marine currents in tidal estuaries are usually bi-directional, change direction 180 degrees with the tide cycles, and are an excellent potential source of hydroelectric power generation. Marine currents in the open ocean are also influenced by the tide cycles and are unusually multi-directional. In some areas, marine currents are uni-directional and are sometimes high velocity. These areas are often found between land masses. Some of these areas of high velocity currents are near large population centers making the transmission of the power to the population centers very efficient. According to a 2006 white paper by the U.S. Department of the Interior, a 12-mph water flow contains about the same energy as a 110-mph air flow. This makes ocean currents a promising source of hydroelectric power which is largely untapped and virtually unlimited in potential.

It is therefore an objective of the present invention to provide a pontoon barge that harnesses marine currents which can be installed globally in varying water depths from shallow to deep using a wide variety of mooring methods well known to those familiar with the art. These moorings can provide the barge with a relatively fixed heading or a weathervane heading. The present invention may even find a vertical column "mooring dolphin" type system very cost effective. The vertical column barge moorings could also be used to support much needed new bridges across tidal estuaries and rivers allowing cost sharing and reducing the costs of both the bridge and the power generation system. Using new or existing bridges for export power cable support, rapid, safe and low-cost maintenance, etc. further lowering the capital expenditure and operational costs of the power generation systems.

DETAIL DESCRIPTIONS OF THE INVENTION

Figure 1:
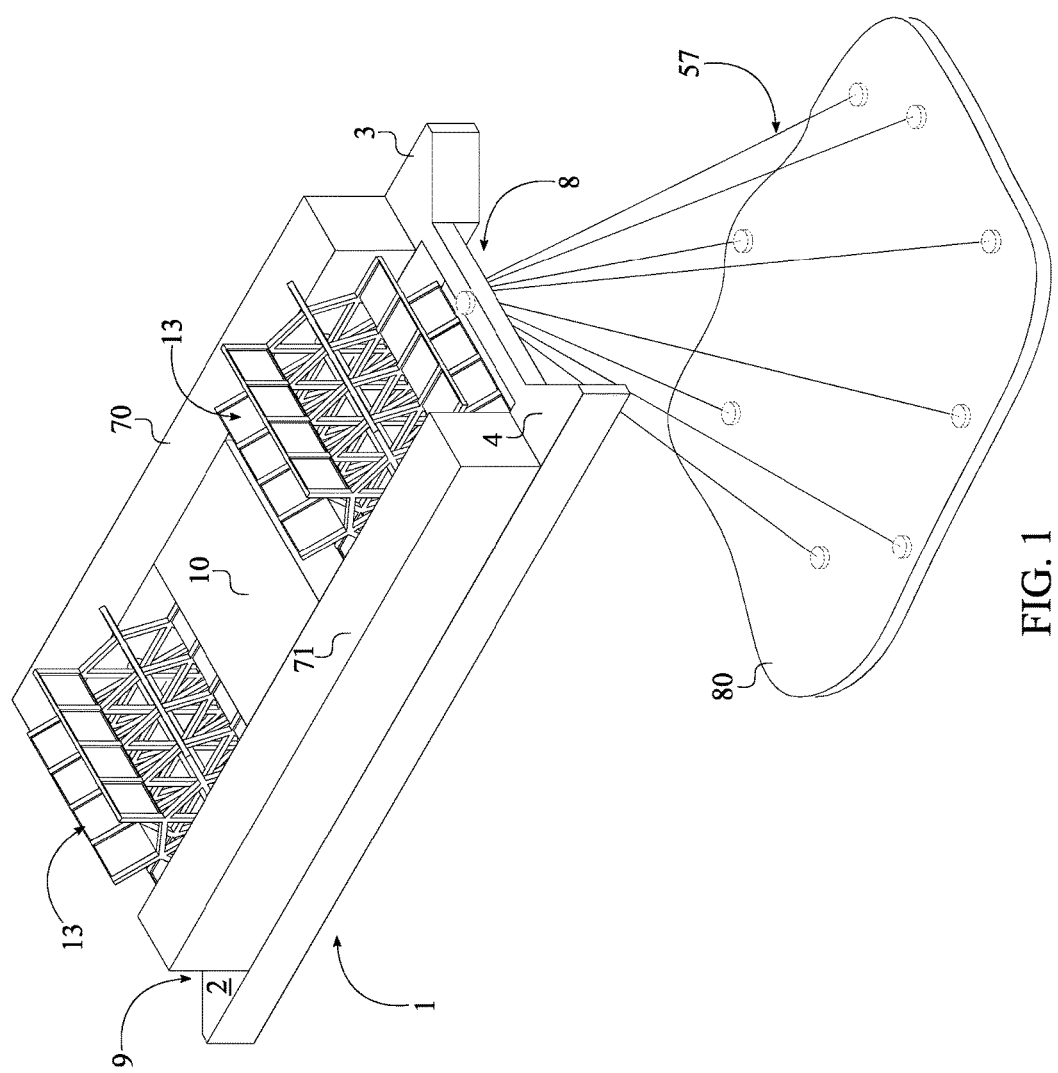
FIG. 1 is a perspective view of the present invention.
Figure 2:
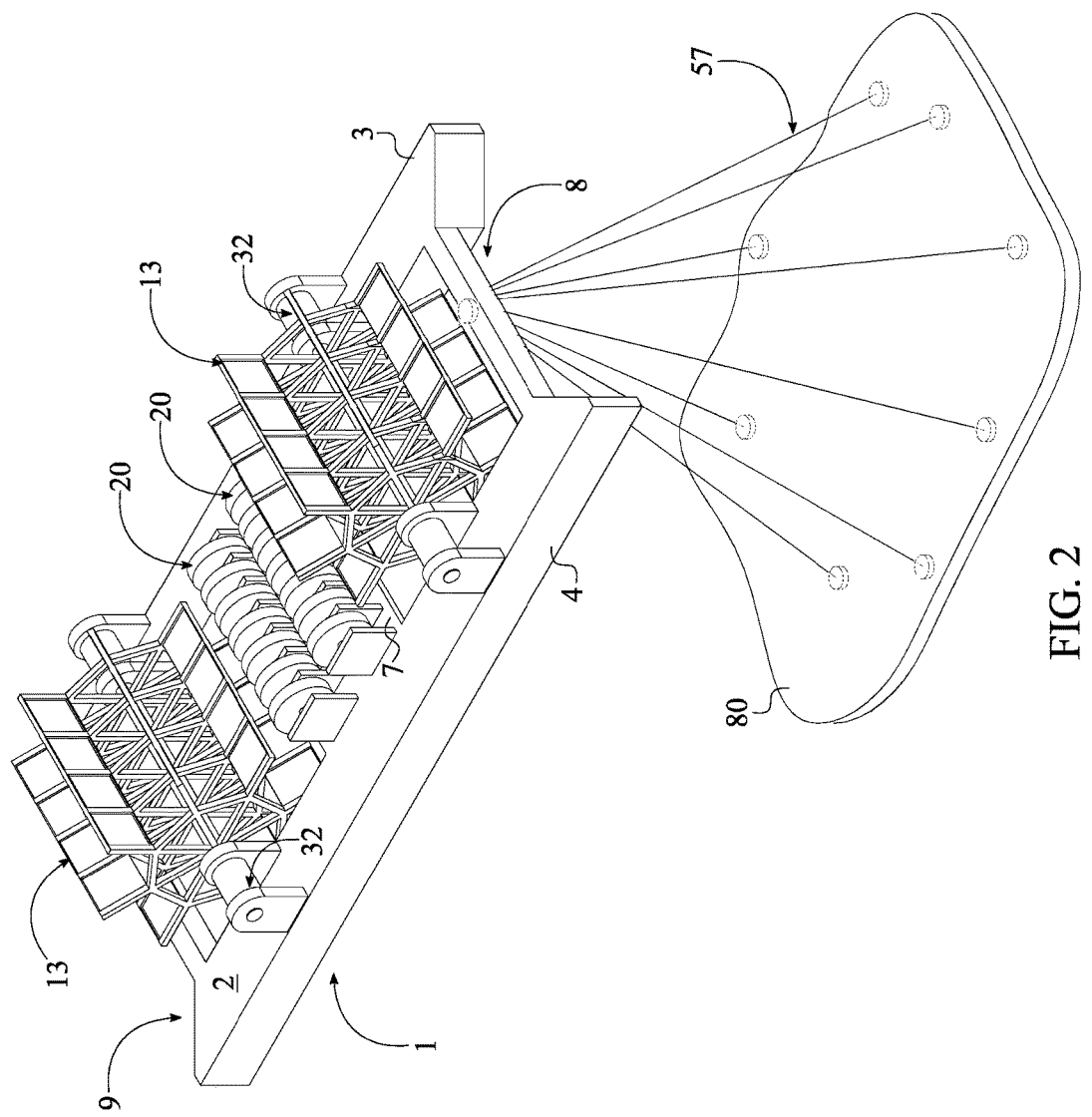
FIG. 2 is a perspective view of the present invention without the enclosure, the port-side enclosure, the starboard-side enclosure to show the at least one generator assembly.
Figure 3:
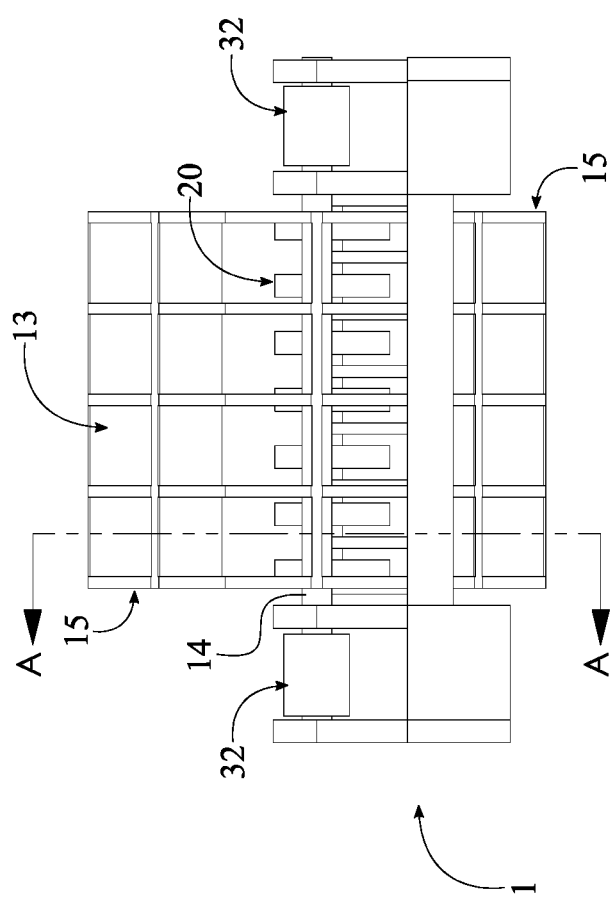
FIG. 3 is a front view of the present invention, without the enclosure, the port-side enclosure, the starboard-side enclosure showing the plane upon which a cross sectional view is taken shown in FIG. 4.
Figure 4:
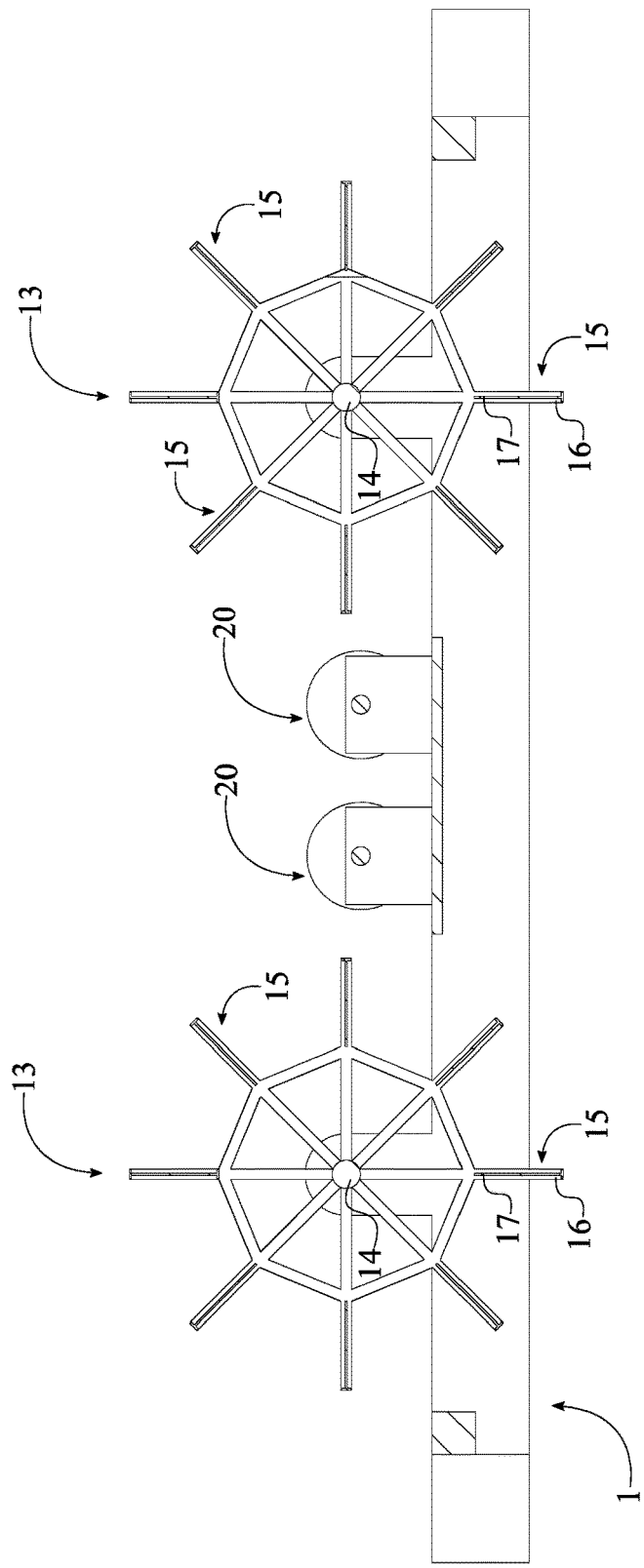
FIG. 4 is a cross section view of the present invention taken along line A-A of FIG. 3, showing the configuration of the at least one paddle wheel assembly.
Figure 5:
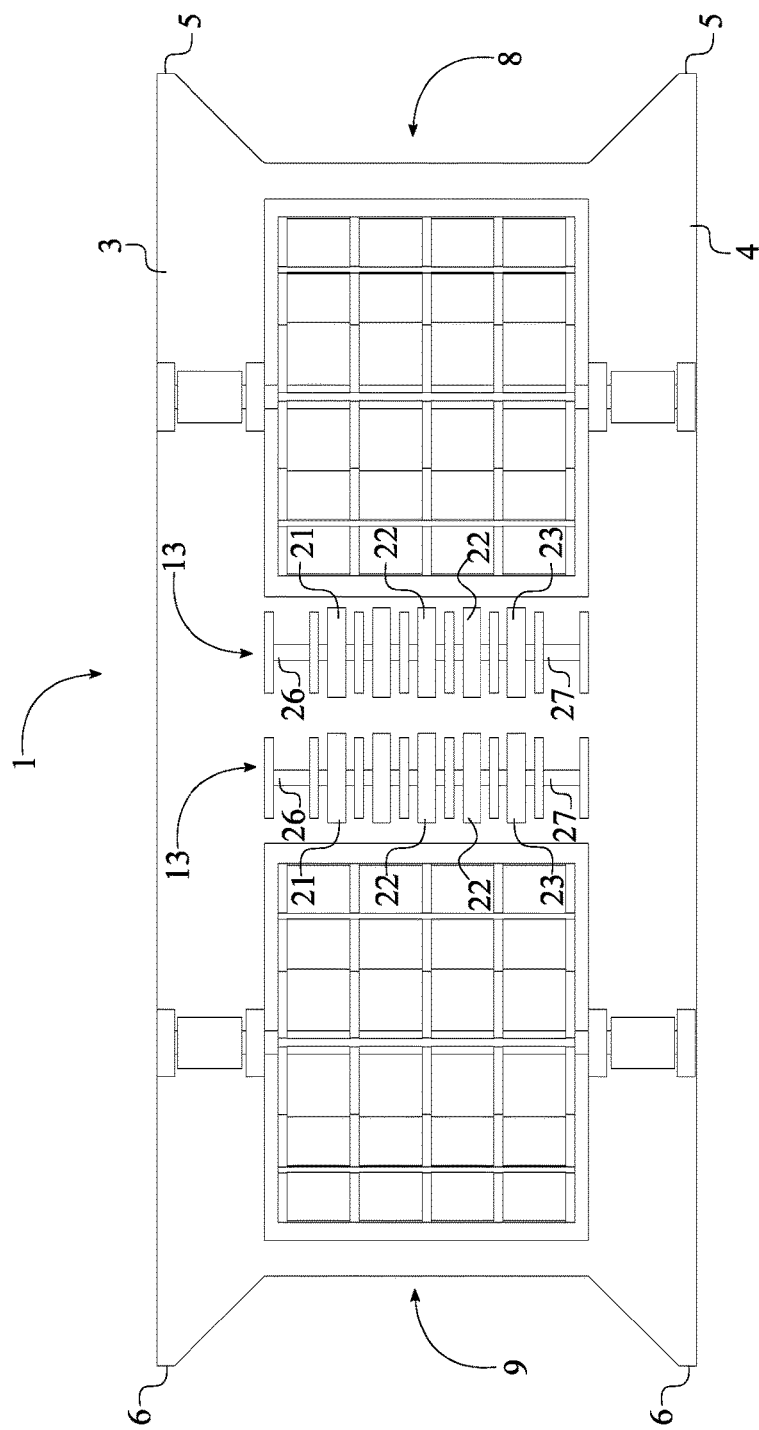
FIG. 5 is a top view of the present invention without the enclosure, the port-side enclosure, the starboard-side enclosure.

All illustrations of the drawings are for the purpose of describing selected versions of the present invention and are not intended to limit the scope of the present invention.

The present invention is a hydroelectricity generating unit that captures marine current energy from river currents, tidal estuary currents or from marine currents. More specifically, the present invention converts water current into the electricity, as the generated electricity from the present invention can be exported into an electrical substation or an electrical distribution center through at least one underwater electrical cable or at least one overhead electrical cable. The present invention is tensionably coupled to a subsurface environment 80 so that the present invention is able to efficiently capture the water current, wherein the subsurface environment 80 can be a seabed, a subsurface structure, or any other underwater surface.

The present invention comprises a floating hull 1, at least one paddle wheel assembly 13, at least one generator assembly 20, a torque transmission system 32, and an anti-drift mooring system 57 as shown in FIG. 1-5. In reference to general configuration of the present invention, the at least one paddle wheel assembly 13 that captures the water current is rotatably mounted to a port-side section 3 and a starboard-side section 4 of the floating hull 1. In order to maintain an efficient rotational movement, the at least one paddle wheel assembly 13 is positioned in between a top section 7 of the floating hull 1, the port-side section 3, and the starboard-side section 4. The at least one generator assembly 20, which converts the water current into hydroelectricity, is mounted onto a top surface 2 of floating hull 1 as a bottom surface of the floating hull 1 contacts the water surface. The at least one paddle wheel assembly 13 is operatively coupled with the at least one generator assembly 20 by the torque transmission system 32, wherein a kinetic energy of the at least one paddle wheel assembly 13 is transferred to the at least one generator assembly 20 by the torque transmission system 32 to generate hydroelectricity. Depending upon different embodiment of the present invention, the torque transmission system 32 can be, but is not limited to, a hydraulic system, a pulley system, a multiple gearbox system, or a direct driveshaft. In order to maintain a fixed position or a turret 58 position for the at least one paddle wheel assembly 13, the floating hull 1 is tensionably coupled to the subsurface environment 80 by the anti-drift mooring system 57.

The floating hull 1 is preferably made into a rectangular shape outer profile with an inner channel to capture and direct water current towards the at least one paddle wheel assembly 13. The floating hull 1 functions as the floating vessel within the present invention and functions as a base structure for the other components of the present invention to be connected. In reference to FIG. 1-2, the port-side section 3 and the starboard-side section 4 are connected parallel to each other by the top section 7. The port-side section 3 and the starboard-side section 4 are preferably configured as pontoons. A bow end 5 of the port-side section 3 and a bow end 5 of the starboard-side section 4 are positioned coplanar to each other. A stern end 6 of the port-side section 3 and a stern end 6 of the starboard-side section 4 are positioned coplanar to each other, opposite of the bow end 5. As a result, the floating hull 1 is able to maintain the rectangular shape outer profile while the inner channel delineated in between the port-side section 3 and the starboard-side section 4. The floating hull 1 further comprises a bow opening 8, a stern opening 9, and an enclosure 10. The bow opening 8 is delineated within the bow end 5 of the port-side section 3 and the bow end 5 of the starboard-side section 4. The stern opening 9 is delineated within the stern end 6 of the port-side section 3 and the stern end 6 of the starboard-side section 4. The bow opening 8 and the stern opening 9 designate outermost ends of the inner channel. As a result, the bow opening 8 opens up to the water current thus allowing water current to be travel towards the at least one paddle wheel assembly 13. Once the water current rotates the at least one paddle wheel assembly 13, the stern opening 9 allows water current to exit the present invention. The enclosure 10 is perimetrically positioned around the top section 7 and hermetically connected to the top section 7. In other words, the enclosure 10 is positioned at the center of the top section 7 and extends above and around the equipment the top section 7 to protect stored equipment from waves, wind and rain and to provide a safe place for people to work. Additionally, the enclosure 10 is large enough to be use optionally as a helideck for fast maintenance crew access if located adjacent to a bridge or a standalone.

Moreover, the top section 7 of the floating hull 1 is structurally supported by the port-side section 3 and the starboard-side section 4 in order to structurally unite the port-side section 3, the starboard-side section 4, and the top section 7 into a strong united 3-sectioned hull. The top section 7 is located completely above the water's surface, which prevents drag from occurring on the present invention as the present invention generates hydroelectricity. This also allows supporting equipment like generators, transformers, switch gear, control rooms, etc. to be kept above the water's surface.

The at least one paddle wheel assembly 13 that rotates by the water current is positioned in between the top section 7, the port-side section 3, and the starboard-side section 4. In reference to FIG. 3-4, the at least one paddle wheel assembly 13 comprises a main axle 14 and a plurality of paddle boards 15. The plurality of paddle boards 15 is connected along the main axle 14 and radially distributed around the main axle 14. More specifically, each of the plurality of paddle boards 15 comprises a support frame 16 and a paddle blade 17 so that the at least one paddle wheel assembly 13 can be formed. The support frame 16, which functions as a connecting member for the paddle blade 17, is laterally connected to the main axle 14. The paddle blade 17 that captures the water current and apply rotational energy to the at least one paddle wheel assembly 13 is slidably connected to the support frame 16. In order to provide continuous rotation and maintain equilibrium, the plurality of paddle boards 15 is equally spaced apart from each other. The main axle 14 is rotatably mounted and extends up to the port-side section 3 and the starboard-side section 4 so that the plurality of paddle boards 15 is able to fully capture the water current that enters into the inner channel. The slidable connection between the support frame 16 and the paddle blade 17 is essential for the present invention during hydroelectricity generation and towing. More specifically, the paddle blade 17 slidably engaged between a lower portion and an upper portion of the support frame 16, wherein the upper portion is positioned proximal to the main axle 14 and the lower portion is positioned distal to the main axle 14. When the present invention is utilized to generate hydroelectricity, the paddle blade 17 is engaged with a lower portion of the support frame 16 so that the paddle blade 17 can fully submerged under the water surface. As a result, the paddle blade 17 is able to fully capture water current thus generating hydroelectricity. When the present invention is towed for repairs or any other reasons, the paddle blade 17 is engaged with an upper portion of the support frame 16 so that the paddle blade 17 can position above the water surface. As a result, the paddle blade 17 applies less drag on the present invention thus providing an easy towing process.

The at least one generator assembly 20 receives kinetic energy from the torque transmission system 32 and coverts the kinetic energy to hydroelectricity. In reference to FIG. 5, the at least one generator assembly 20 comprises a first generator 21, a plurality of intermediate generators 22, a second generator 23, a first connector axle 26, and a second connector axle 27. A stator 24 of the first generator 21, the plurality of intermediate generators 22, and the second generator 23 are connected to the top surface 2. A rotor 25 of the first generator 21, the plurality of intermediate generators 22, and the second generator 23 are axially connected to each other so that the first generator 21, the plurality of intermediate generators 22, and the second generator 23 operate as a single entity. The first connector axle 26 is axially connected to the rotor 25 of the first generator 21, opposite of the plurality of intermediate generators 22. The second connector axle 27 is axially connected to the rotor 25 of the second generator 23, opposite of the plurality of intermediate generators 22. Resultantly, the first connector axle 26 and the second connector axle 27 are mounted onto the top surface 2 of floating hull 1 thus enabling the torque transmission system 32 to transfer rotational energy from the at least one paddle wheel assembly 13.

In reference to FIG. 1, the present invention further comprises a port-side enclosure 70 and a starboard-side enclosure 71 in addition to the enclosure 10 that is positioned atop the top section 7. More specifically, the port-side enclosure 70 is perimetrically positioned around the port-side section 3 and hermetically connected to the port-side section 3 thus providing a watertight compartment. The starboard-side enclosure 71 is perimetrically positioned around the starboard-side section 4 and hermetically connected to the starboard-side section 4 thus providing a watertight compartment.

Figure 6:
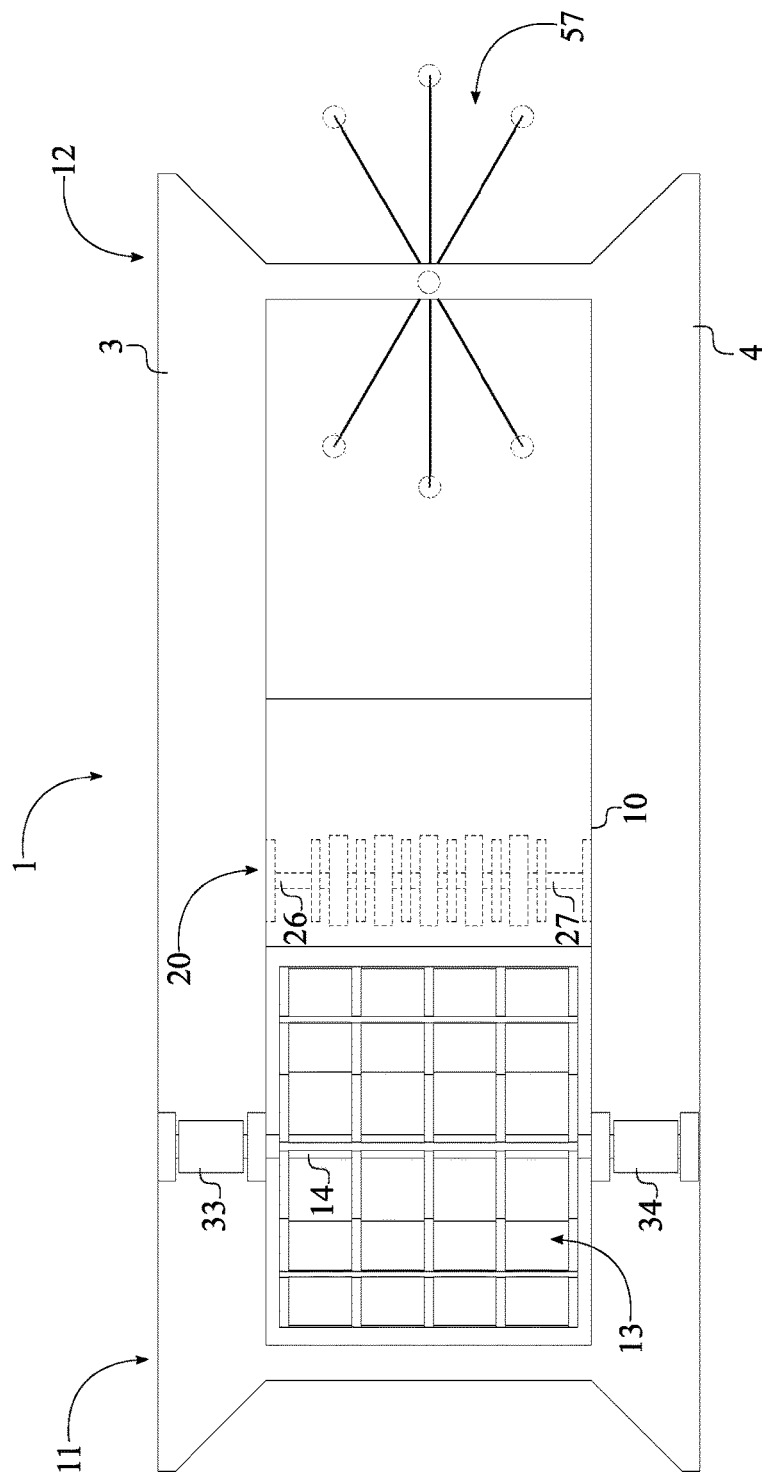
FIG. 6 is a top view for the first configuration of the first embodiment with hydraulic drive motors, showing the single wheel assembly and the single row of generators.
Figure 7:
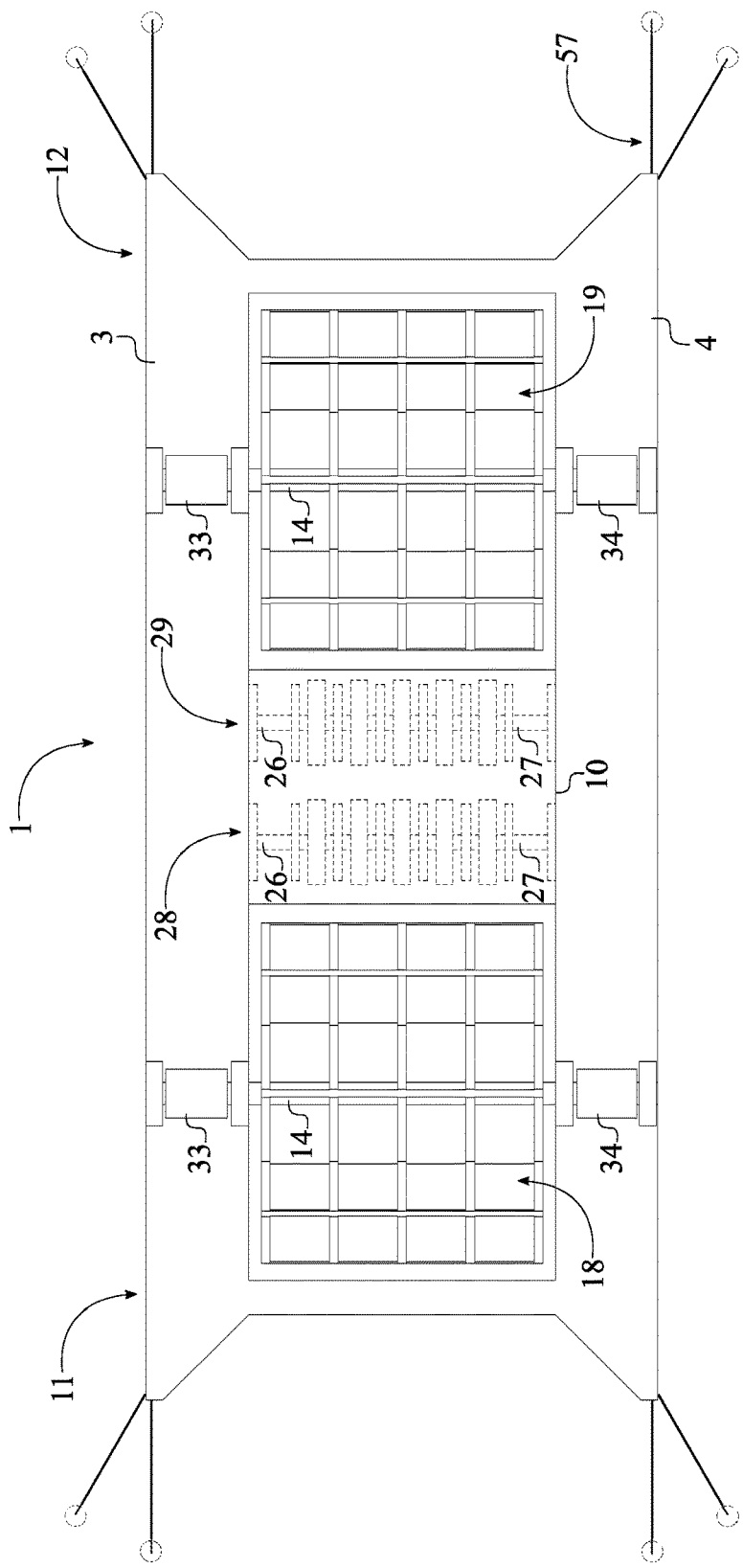
FIG. 7 is a top view for the second configuration of the first embodiment with hydraulic drive motors, showing the multiple wheel assemblies and the multiple rows of generators.
Figure 8:
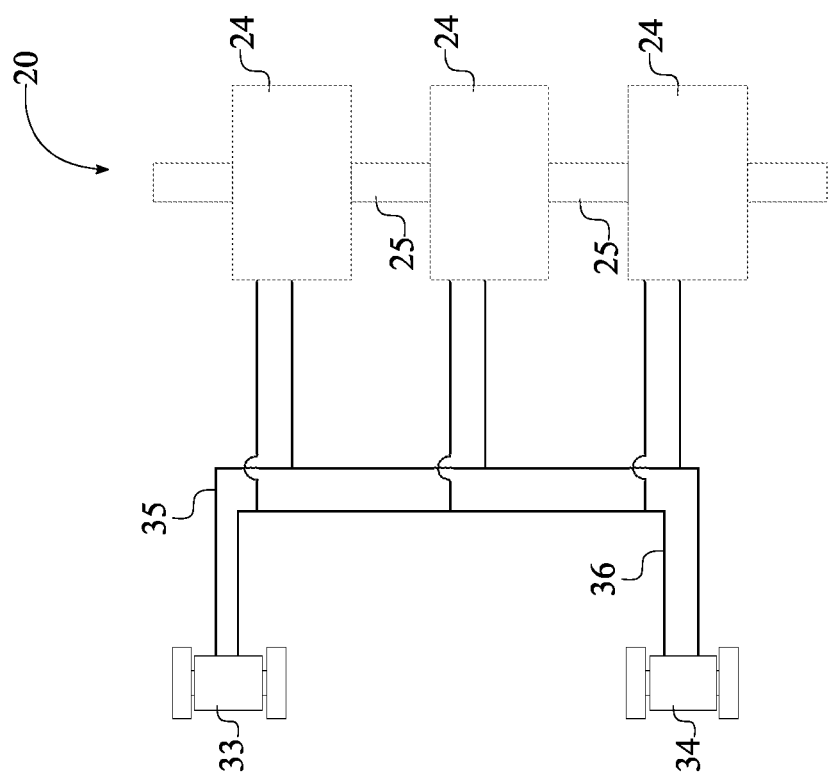
FIG. 8 is a schematic view showing the in-fluid communication of the first embodiment.

In reference to a first embodiment of the present invention, the torque transmission system 32 comprises a port-side hydraulic drive motor 33, a starboard-side hydraulic drive motor 34, a supply line 35, and a return line 36 as shown in FIG. 6-8. More specifically, the main axle 14 for the at least one paddle wheel assembly 13 is torsionally connected to the port-side hydraulic drive motor 33 and positioned adjacent to the port-side section 3 from one side. The main axle 14 for the at least one paddle wheel assembly 13 is torsionally connected to the starboard-side hydraulic drive motor 34 and positioned adjacent to the starboard-side section 4 from opposite side. The supply line 35 and the return line 36 functions as the fluid transferring lines within the first embodiment so that the at least one generator assembly 20 can be operational. More specifically, the port-side hydraulic drive motor 33 and the starboard-side hydraulic drive motor 34 are in fluid communication with the rotor 25 of the first generator 21, the plurality of intermediate generators 22, and the second generator 23 through the supply line 35. As a result, pressurized hydraulic fluid discharges from the port-side hydraulic drive motor 33 and the starboard-side hydraulic drive motor 34 to the at least one generator assembly 20 thus generating hydroelectricity. The port-side hydraulic drive motor 33 and the starboard-side hydraulic drive motor 34 are in fluid communication with the rotor 25 of the first generator 21, the plurality of intermediate generators 22, and the second generator 23 through the return line 36. As a result, the depressurized hydraulic fluid discharges from the at least one generator assembly 20 to the port-side hydraulic drive motor 33 and the starboard-side hydraulic drive motor 34 thus maintaining a continuous closed looped fluid circulation. In reference to FIG. 8, the at least one generator assembly 20 is positioned atop the top section 7. More specifically, the first generator 21, the plurality of intermediate generators 22, and the second generator 23 are positioned within the enclosure 10. The enclosure 10 may comprise a corridor section that positioned at the top section 7 allowing a user to provide service to or replace the at least one generator assembly 20. The at least one generator assembly 20 could also be replaced by being lifted up through a hatch in the enclosure 10. Additionally, the starboard-side hydraulic drive motor 34 is positioned with the starboard-side enclosure 71, and the port-side hydraulic drive motor 33 is positioned with the port-side enclosure 70 thus protecting the torque transmission system 32 from outside elements.

In reference to a first configuration of the first embodiment, the at least one paddle wheel assembly 13 is a single wheel assembly and the at least one generator assembly 20 is a single row of generators as shown in FIG. 6. The floating hull 1 further comprises a first end 11 and a second end 12 that are adjacently positioned with each other. More specifically, the port-side hydraulic drive motor 33 and the starboard-side hydraulic drive motor 34 are positioned adjacent to the first end 11. The single wheel assembly and the single row of generators are positioned adjacent to the first end 11. The anti-drift mooring system 57 is rotatably connected to the second end 12 so that the anti-drift mooring system 57 can functions as a counterweight mooring system within the first configuration of the first embodiment.

In reference to a second configuration of the first embodiment, the at least one paddle wheel assembly 13 comprises a first wheel assembly 18 and a second wheel assembly 19, and the at least one generator assembly 20 comprises a first row of generators 28 and a second row of generators 29 as shown in FIG. 7. More specifically, the port-side hydraulic drive motor 33 and the starboard-side hydraulic drive motor 34 for the first wheel assembly 18 are positioned adjacent to the first end 11 as the first wheel assembly 18 and the first row of generators 28 are positioned adjacent to the first end 11. Similarly, the port-side hydraulic drive motor 33 and the starboard-side hydraulic drive motor 34 for the second wheel assembly 19 are positioned adjacent to the second end 12 as the second wheel assembly 19 and the second row of generators 29 are positioned adjacent to the second end 12. In order maintain stationary position for the second configuration of the first embodiment, the anti-drift mooring system 57 is connected to the first end 11 and the second end 12.

Figure 9:
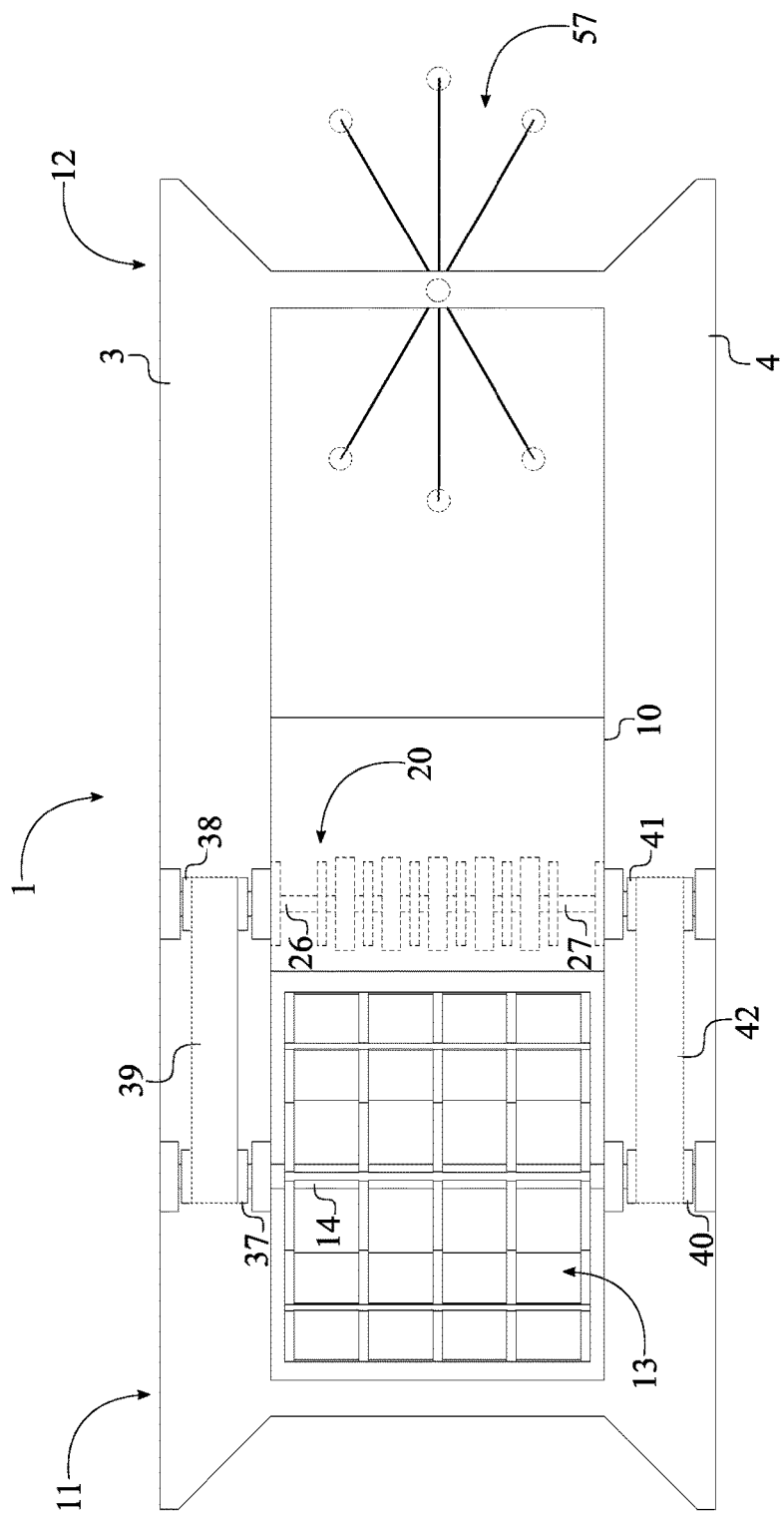
FIG. 9 is a top view for the first configuration of the second embodiment with the pulley system, showing the single wheel assembly and the single row of generators.
Figure 10:
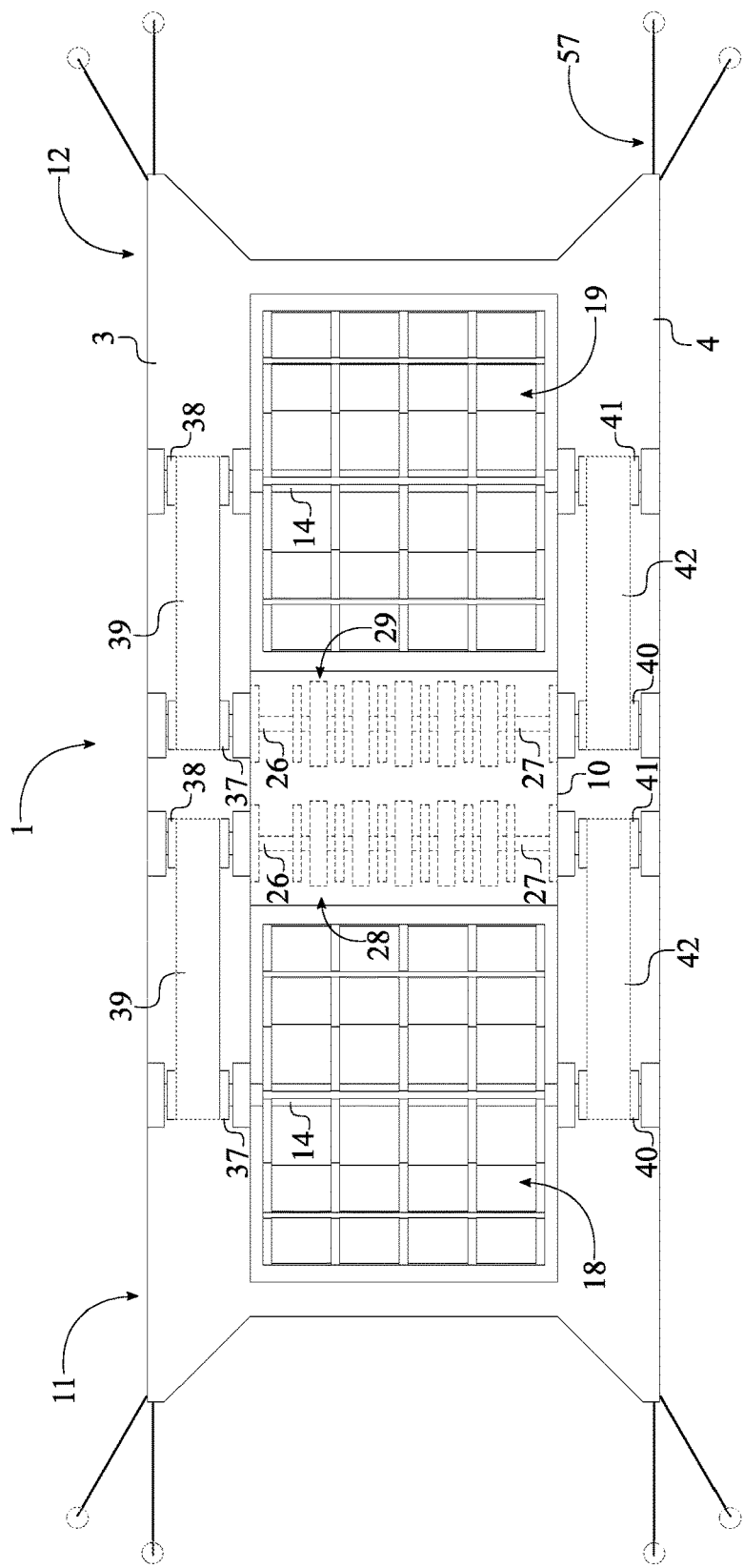
FIG. 10 is a top view for the second configuration of the second embodiment with the pulley system, showing the multiple wheel assemblies and the multiple rows of generators.

In reference to a second embodiment of the present invention, the torque transmission system 32 comprises a port-side driver pulley 37, a port-side driven pulley 38, a port-side belt 39, a starboard-side driver pulley 40, a starboard-side driven pulley 41, and a starboard-side belt 42 as shown in FIG. 9-10. More specifically, the main axle 14 for the at least one paddle wheel assembly 13 is torsionally connected to the port-side driver pulley 37 and positioned adjacent to the port-side section 3 from one side. The main axle 14 for the at least one paddle wheel assembly 13 is torsionally connected to the starboard-side driver pulley 40 and positioned adjacent to the starboard-side section 4 from opposite side. The first connector axle 26 is torsionally connected to the port-side driven pulley 38 and positioned adjacent to the port-side section 3. The second connector axle 27 is torsionally connected to the starboard-side driven pulley 41 and positioned adjacent to the starboard-side section 4. The port-side belt 39 is tensionably engaged about the port-side driver pulley 37 and the port-side driven pulley 38 so that the at least one generator assembly 20 can be operational from the port-side section 3. The starboard-side belt 42 is tensionably engaged about the starboard-side driver pulley 40 and the starboard-side driven pulley 41 so that the at least one generator assembly 20 can be operational from the starboard-side section 4. As a result, the kinetic energy of the at least one paddle wheel assembly 13 can be transferred into the first connector axle 26 and the second connector axle 27 through the port-side belt 39 and the starboard-side belt 42 thus generating hydroelectricity within the at least one generator assembly 20. In reference to FIG. 9-10, the at least one generator assembly 20 is positioned atop the top section 7 as the first generator 21, the plurality of intermediate generators 22, and the second generator 23 are positioned within the enclosure 10. Additionally, the starboard-side driver pulley 40, the starboard-side driven pulley 41, and the starboard-side belt 42 are positioned with the starboard-side enclosure 71, and the port-side driver pulley 37, the port-side driven pulley 38, and the port-side belt 39 are positioned with the port-side enclosure 70 thus protecting the torque transmission system 32 from outside elements.

In reference to a first configuration of the second embodiment, the at least one paddle wheel assembly 13 is a single wheel assembly and the at least one generator assembly 20 is a single row of generators as shown in FIG. 9. More specifically, the port-side driver pulley 37, the port-side driven pulley 38, the port-side belt 39, the starboard-side driver pulley 40, the starboard-side driven pulley 41, and the starboard-side belt 42 are positioned adjacent the first end 11. The single wheel assembly and the single row of generators are positioned adjacent to the first end 11. The anti-drift mooring system 57 is rotatably connected to the second end 12 so that the anti-drift mooring system 57 can functions as a counterweight mooring system within the first configuration of the second embodiment.

In reference to a second configuration of the first embodiment, the at least one paddle wheel assembly 13 comprises the first wheel assembly 18 and the second wheel assembly 19, and the at least one generator assembly 20 comprises the first row of generators 28 and the second row of generators 29 as shown in FIG. 10. More specifically, the port-side driver pulley 37, the port-side driven pulley 38, the port-side belt 39, the starboard-side driver pulley 40, the starboard-side driven pulley 41, and the starboard-side belt 42 for the first wheel assembly 18 are positioned adjacent to the first end 11 as the first wheel assembly 18 and the first row of generators 28 are positioned adjacent to the first end 11. Similarly, the port-side driver pulley 37, the port-side driven pulley 38, the port-side belt 39, the starboard-side driver pulley 40, the starboard-side driven pulley 41, and the starboard-side belt 42 for the second wheel assembly 19 are positioned adjacent to the second end 12 as the second wheel assembly 19 and the second row of generators 29 are positioned adjacent to the second end 12. In order maintain stationary position for the second configuration of the second embodiment, the anti-drift mooring system 57 is connected to the first end 11 and the second end 12.

Figure 11:
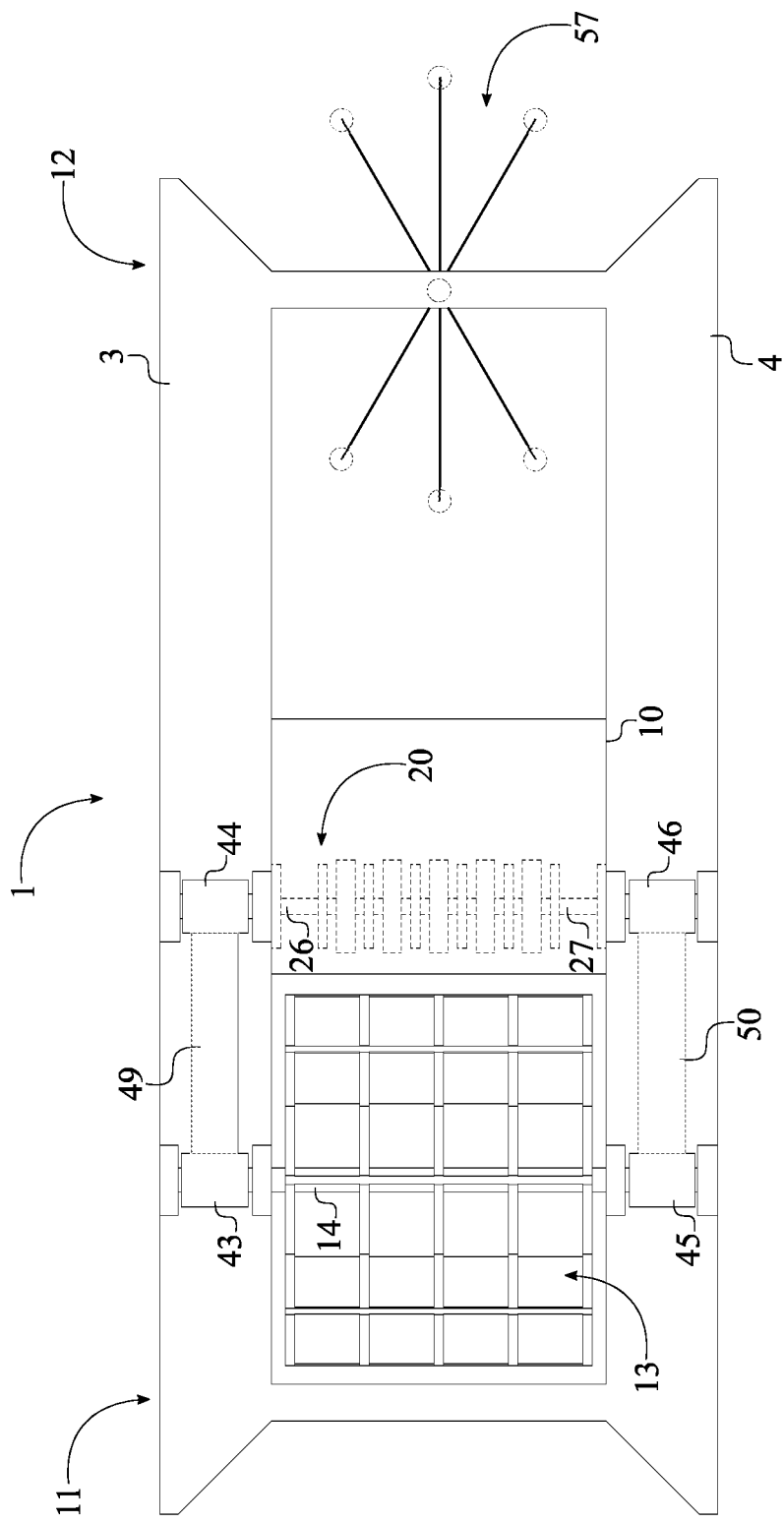
FIG. 11 is a top view for the first configuration of the third embodiment with the gearbox system, showing the single wheel assembly and the single row of generators.
Figure 12:
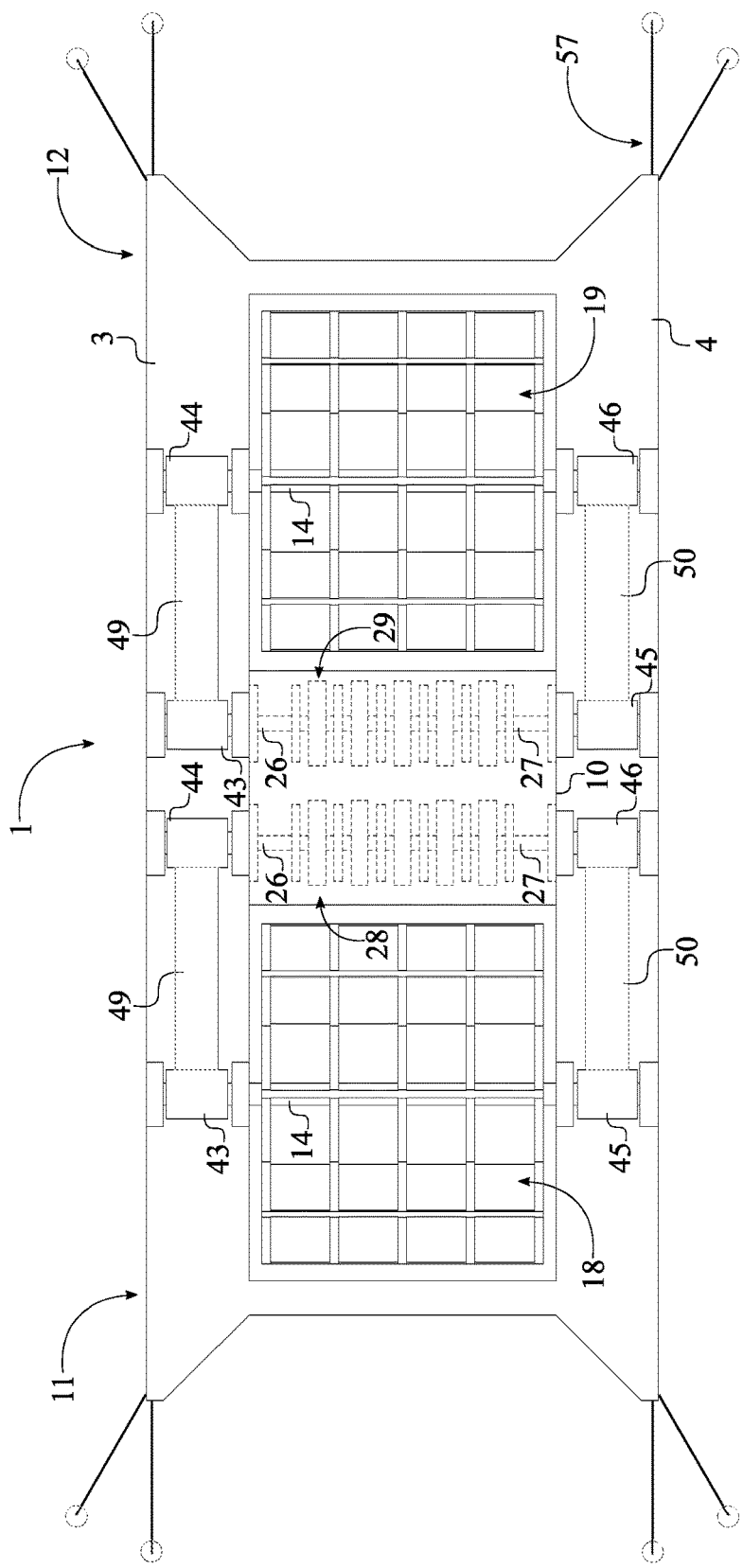
FIG. 12 is a top view for the second configuration of the third embodiment with the gearbox system, showing the multiple wheel assemblies and the multiple rows of generators.
Figure 13:
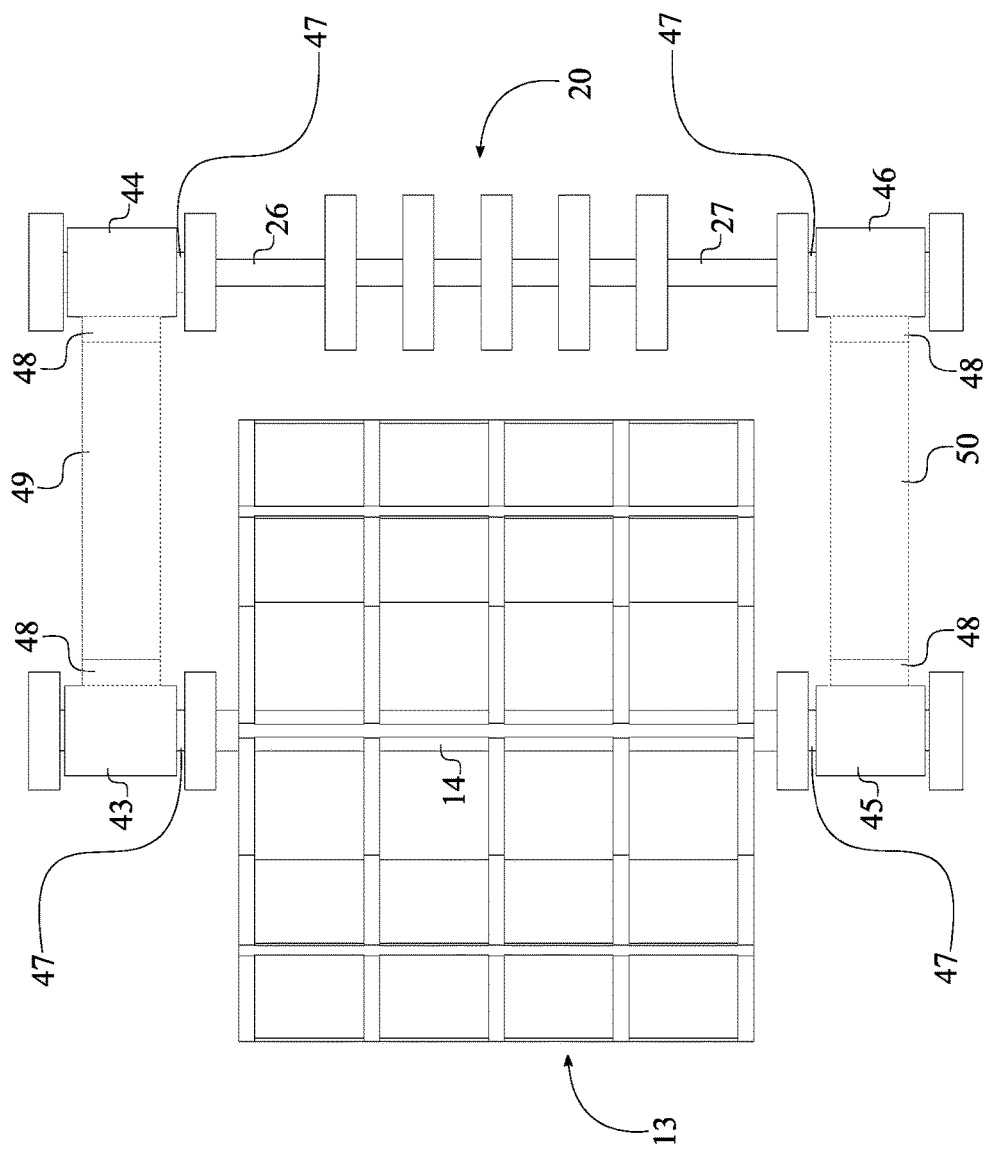
FIG. 13 is a schematic view showing the configuration of the gearbox system for the third embodiment.

In reference to a third embodiment of the present invention, the torque transmission system 32 comprises a port-side driver gearbox 43, a port-side driven gearbox 44, a port-side drive axle 49, a starboard-side driver gearbox 45, a starboard-side driven gearbox 46, and a starboard-side drive axle 50 as shown in FIG. 11-13. More specifically, the main axle 14 for the at least one paddle wheel assembly 13 is torsionally connected to an input gear 47 of the port-side driver gearbox 43 and positioned adjacent to the port-side section 3 from one side. The main axle 14 for the at least one paddle wheel assembly 13 is torsionally connected to an input gear 47 of the starboard-side driver gearbox 45 and positioned adjacent to the starboard-side section 4 from opposite side. The first connector axle 26 is torsionally connected to an input gear 47 of the port-side driven gearbox 44 and positioned adjacent to the port-side section 3. The second connector axle 27 is torsionally connected to an input gear 47 of the starboard-side driven gearbox 46 and positioned adjacent to the starboard-side section 4. The port-side drive axle 49 is torsionally connected to an output gear 48 of the port-side driver gearbox 43 and an output gear 48 of the port-side driven gearbox 44 so that the at least one generator assembly 20 can be operational from the port-side section 3. The starboard-side drive axle 50 is torsionally connected to an output gear 48 of the starboard-side driver gearbox 45 and an output gear 48 of the starboard-side driven gearbox 46 so that the at least one generator assembly 20 can be operational from the starboard-side section 4. As a result, the kinetic energy of the at least one paddle wheel assembly 13 can be transferred into the first connector axle 26 and the second connector axle 27 through the port-side drive axle 49 and the starboard-side drive axle 50 thus generating hydroelectricity within the at least one generator assembly 20. In reference to FIG. 11-12, the at least one generator assembly 20 is positioned atop the top section 7 as the first generator 21, the plurality of intermediate generators 22, and the second generator 23 are positioned within the enclosure 10. Additionally, the starboard-side driver gearbox 45, the starboard-side driven gearbox 46, and the starboard-side drive axle 50 are positioned with the starboard-side enclosure 71, and the port-side driver gearbox 43, the port-side driven gearbox 44, the port-side drive axle 49 are positioned with the port-side enclosure 70 thus protecting the torque transmission system 32 from outside elements.

In reference to a first configuration of the second embodiment, the at least one paddle wheel assembly 13 is a single wheel assembly and the at least one generator assembly 20 is a single row of generators as shown in FIG. 11. More specifically, the port-side driver gearbox 43, the port-side driven gearbox 44, the port-side drive axle 49, the starboard-side driver gearbox 45, the starboard-side driven gearbox 46, and the starboard-side drive axle 50 are positioned adjacent the first end 11. The single wheel assembly and the single row of generators are positioned adjacent to the first end 11. The anti-drift mooring system 57 is rotatably connected to the second end 12 so that the anti-drift mooring system 57 can functions as a counterweight mooring system within the first configuration of the third embodiment.

In reference to a second configuration of the first embodiment, the at least one paddle wheel assembly 13 comprises the first wheel assembly 18 and the second wheel assembly 19, and the at least one generator assembly 20 comprises the first row of generators 28 and the second row of generators 29 as shown in FIG. 12. More specifically, the port-side driver gearbox 43, the port-side driven gearbox 44, the port-side drive axle 49, the starboard-side driver gearbox 45, the starboard-side driven gearbox 46, and the starboard-side drive axle 50 for the first wheel assembly 18 are positioned adjacent to the first end 11 as the first wheel assembly 18 and the first row of generators 28 are positioned adjacent to the first end 11. Similarly, the port-side driver gearbox 43, the port-side driven gearbox 44, the port-side drive axle 49, the starboard-side driver gearbox 45, the starboard-side driven gearbox 46, and the starboard-side drive axle 50 for the second wheel assembly 19 are positioned adjacent to the second end 12 as the second wheel assembly 19 and the second row of generators 29 are positioned adjacent to the second end 12. In order maintain stationary position for the second configuration of the third embodiment, the anti-drift mooring system 57 is connected to the first end 11 and the second end 12.

Figure 14:
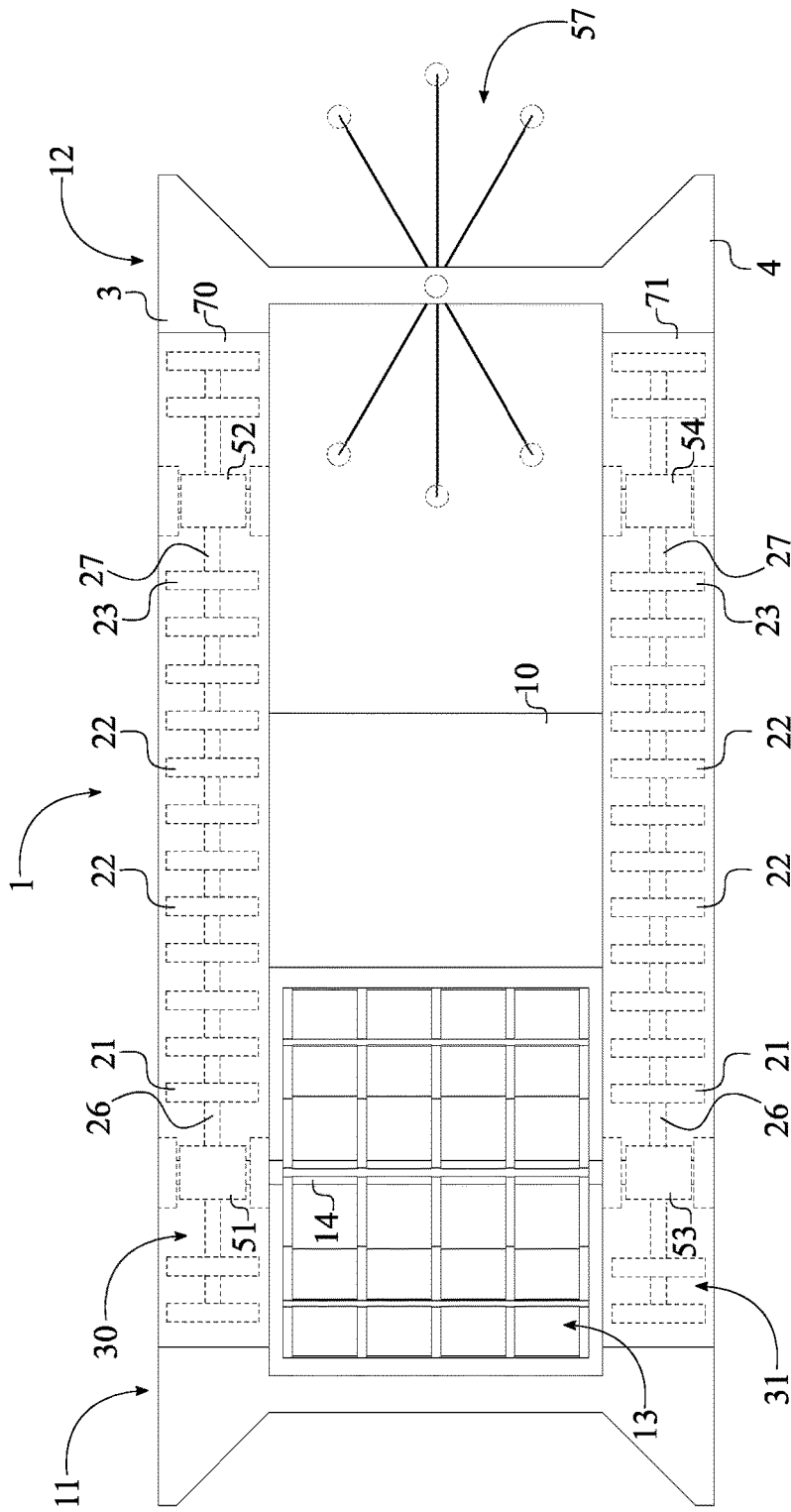
FIG. 14 is a top view for the first configuration of the fourth embodiment with gearbox system, showing the single wheel assembly and the multiple rows of generators.
Figure 15:
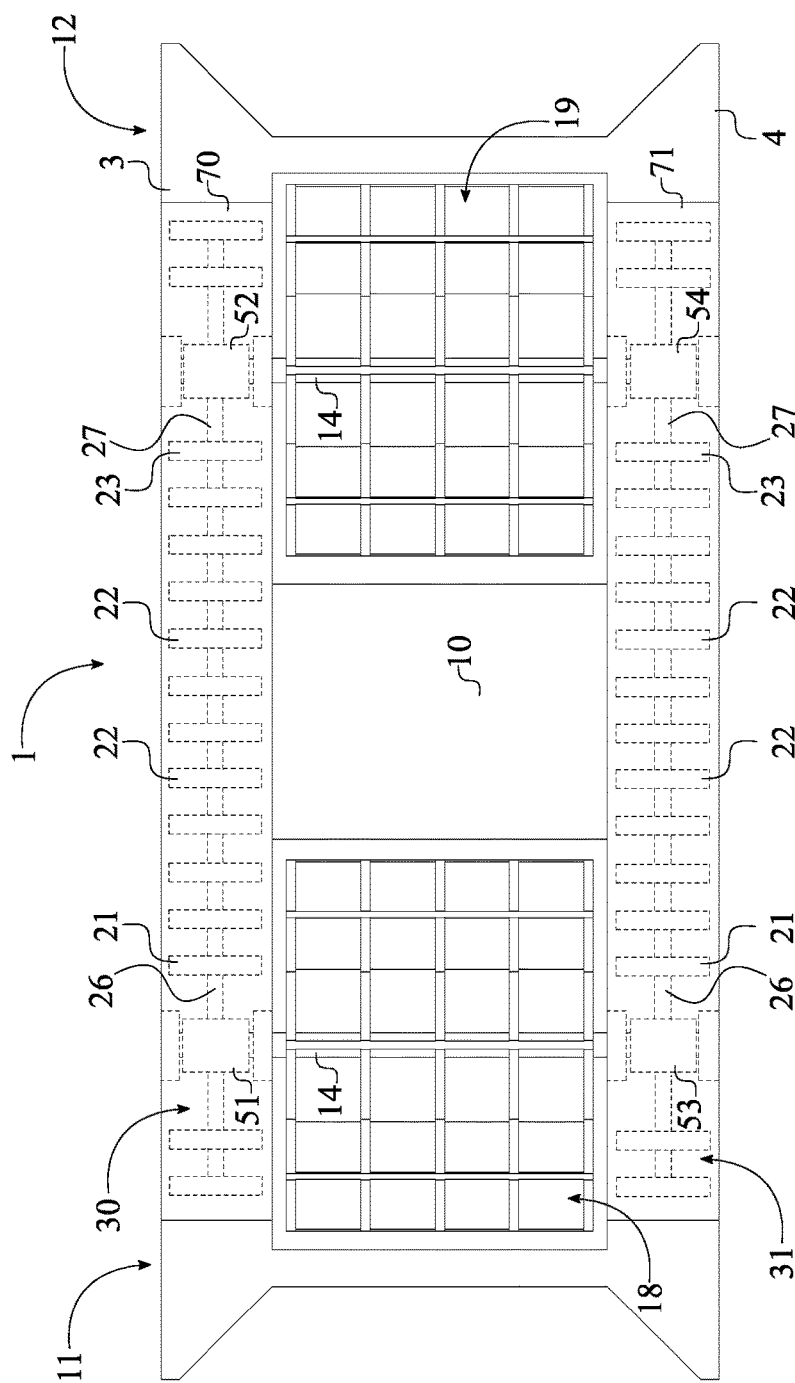
FIG. 15 is a top view for the second configuration of the fourth embodiment with gearbox system, showing the multiple wheel assemblies and the multiple rows of generators.
Figure 16:
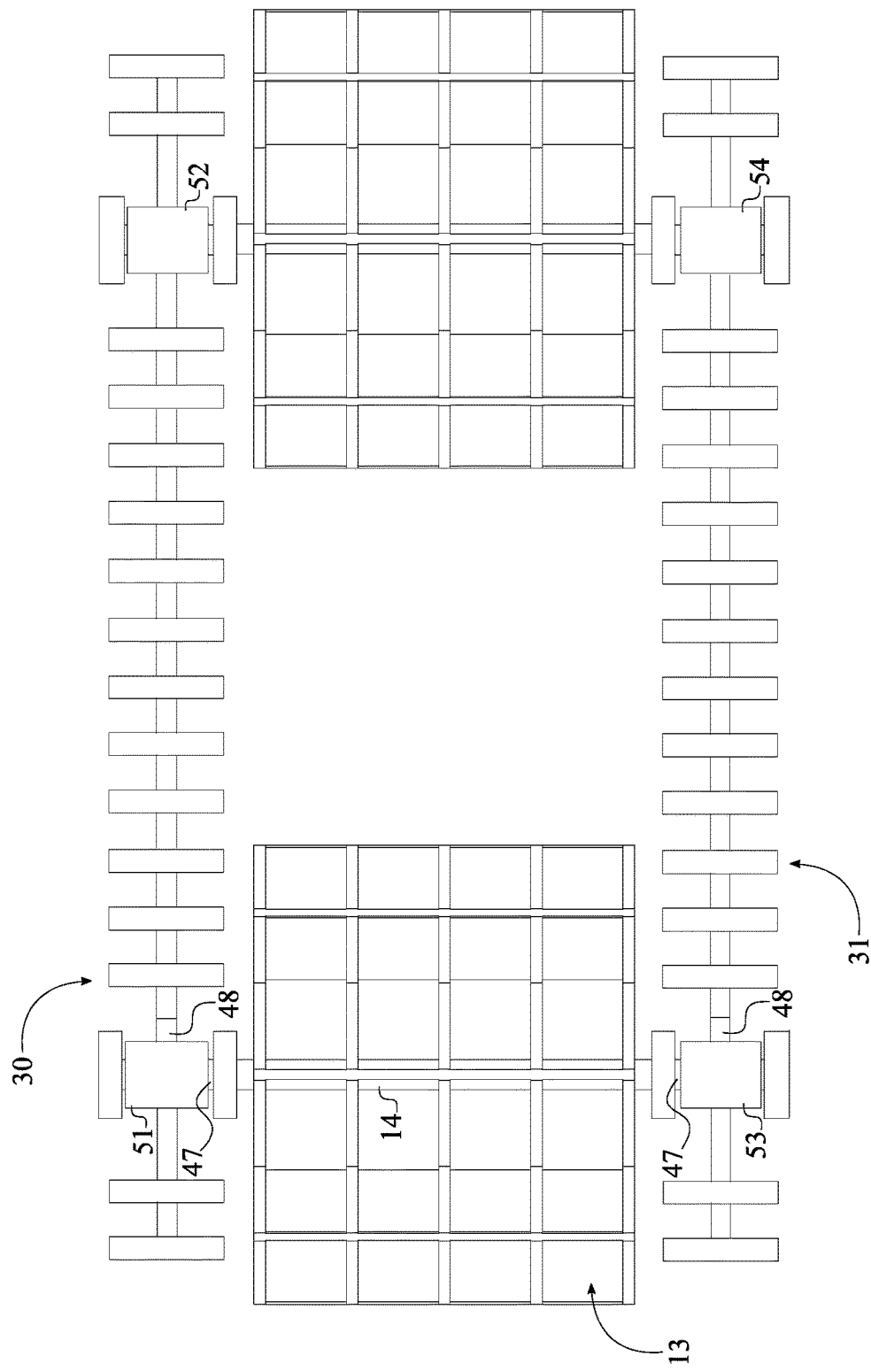
FIG. 16 is a schematic view showing the configuration of the gearbox system for the fourth embodiment.

In reference to a fourth embodiment of the present invention, the torque transmission system 32 comprises a first port-side gearbox 51, a second port-side gearbox 52, a first starboard-side gearbox 53, and a second starboard-side gearbox 54 as shown in FIG. 14-16. The at least one generator assembly 20 further comprises a linear set of port-side generators 30 and a linear set of starboard-side generators 31. More specifically, the main axle 14 for the at least one paddle wheel assembly 13 is torsionally connected to an input gear 47 of the first port-side gearbox 51 and positioned adjacent to the port-side section 3 from one side. The main axle 14 for the at least one paddle wheel assembly 13 is torsionally connected to an input gear 47 of the first starboard-side driver gearbox 45 and positioned adjacent to the starboard-side section 4 from opposite side. The linear set of port-side generators 30 is positioned along the port-side section 3. The linear set of starboard-side generators 31 is positioned along the starboard-side section 4. The first connector axle 26 of the linear set of port-side generators 30 is torsionally connected to an input gear 47 of the first port-side gearbox 51 and positioned adjacent to the port-side section 3. The second connector axle 27 of the linear set of port-side generators 30 is torsionally connected to an input gear 47 of the second port-side gearbox 52 and positioned adjacent to the port-side section 3. The first connector axle 26 of the linear set of starboard-side generators 31 is torsionally connected to an input gear 47 of the first starboard-side gearbox 53 and positioned adjacent to the starboard-side section 4. The second connector axle 27 of the linear set of starboard-side generators 31 is torsionally connected to an input gear 47 of the second starboard-side gearbox 54 and positioned adjacent to the starboard-side section 4. Since the main axle 14 torsionally engaged with the linear set of port-side generators 30 and the linear set of starboard-side generators 31 through the torque transmission system 32, the kinetic energy of the at least one paddle wheel assembly 13 can be transferred into the first connector axle 26 and the second connector axle 27 to generate hydroelectricity within the at least one generator assembly 20. Additionally, the linear set of port-side generators 30 is positioned with the starboard-side enclosure 71, and the starboard-side enclosure 71 is positioned with the port-side enclosure 70 thus protecting the torque transmission system 32 from outside elements.

In reference to a first configuration of the fourth embodiment, the at least one paddle wheel assembly 13 is a single wheel assembly as shown in FIG. 14. More specifically, the first port-side gearbox 51 and the first starboard-side gearbox 53 are positioned adjacent to the first end 11. The second port-side gearbox 52 and the second starboard-side gearbox 54 are positioned adjacent to the second end 12. The single wheel assembly is positioned adjacent to the first end 11. The anti-drift mooring system 57 is rotatably connected to the second end 12 so that the anti-drift mooring system 57 can functions as a counterweight mooring system within the first configuration of the fourth embodiment.

In reference to a second configuration of the fourth embodiment, the at least one paddle wheel assembly 13 comprises the first wheel assembly 18 and the second wheel assembly 19 as shown in FIG. 15. More specifically, the first port-side gearbox 51, the first starboard-side gearbox 53, and the first wheel assembly 18 are positioned adjacent to the first end 11. The second port-side gearbox 52, the second starboard-side gearbox 54, and the second wheel assembly 19 are positioned adjacent to the second end 12. In order maintain stationary position for the second configuration of the third embodiment, the anti-drift mooring system 57 is connected to the first end 11 and the second end 12.

Figure 17:
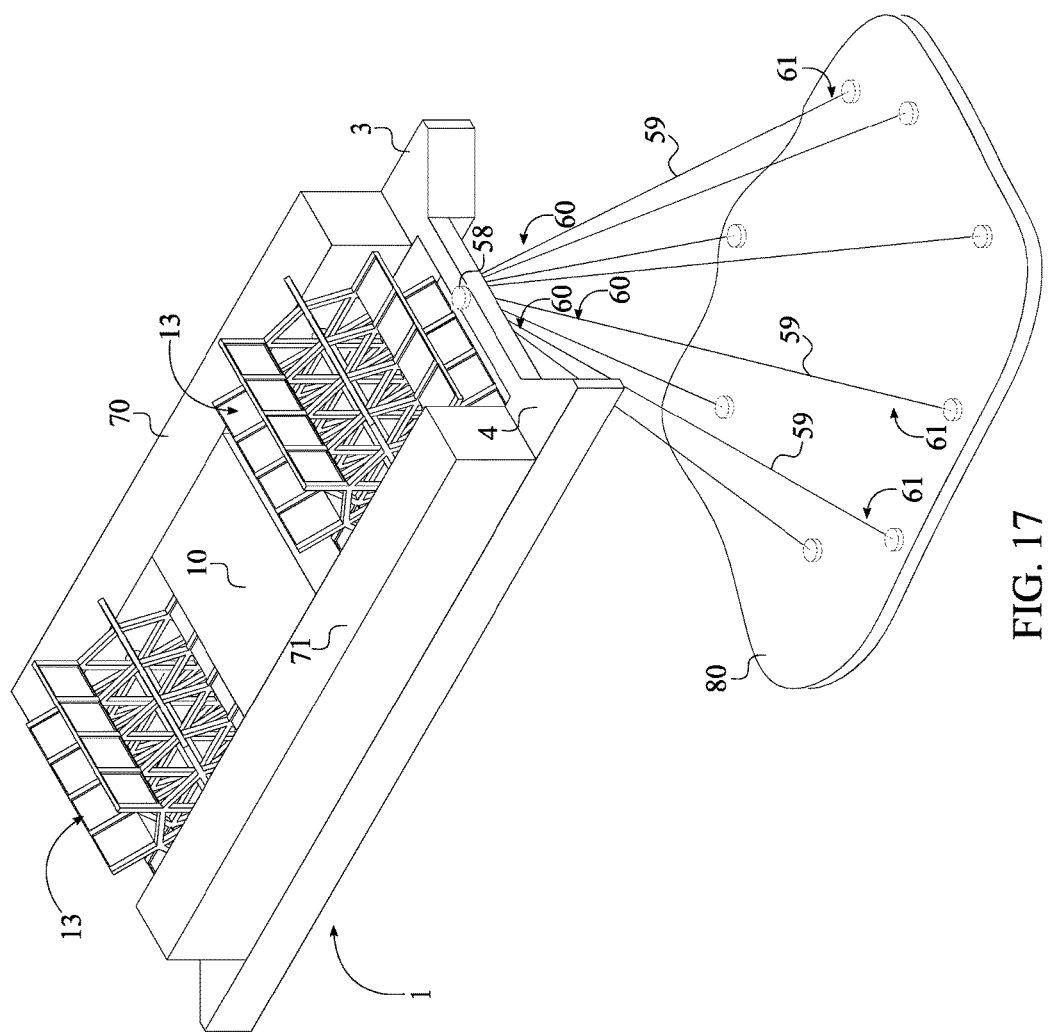
FIG. 17 is a perspective view of the present invention, showing the turret mooring system.

The present invention can utilize a turret 58 mooring system as the anti-drift mooring system 57 that comprises a turret 58 and a plurality of mooring lines 59 as shown in FIG. 17. More specifically, the at least one generator assembly 20 is positioned adjacent to the first end 11 as the turret 58 is rotatably connected to the second end 12 of the floating hull 1. A top end 60 of the plurality of mooring lines 59 is connected to the turret 58 while a bottom end 61 of the plurality of mooring lines 59 is connected to the subsurface environment 80. As a result, the floating hull 1 is able to rotate about the turret 58 with respect to the direction of water current optimizing the efficiency of the present invention.

Figure 18:
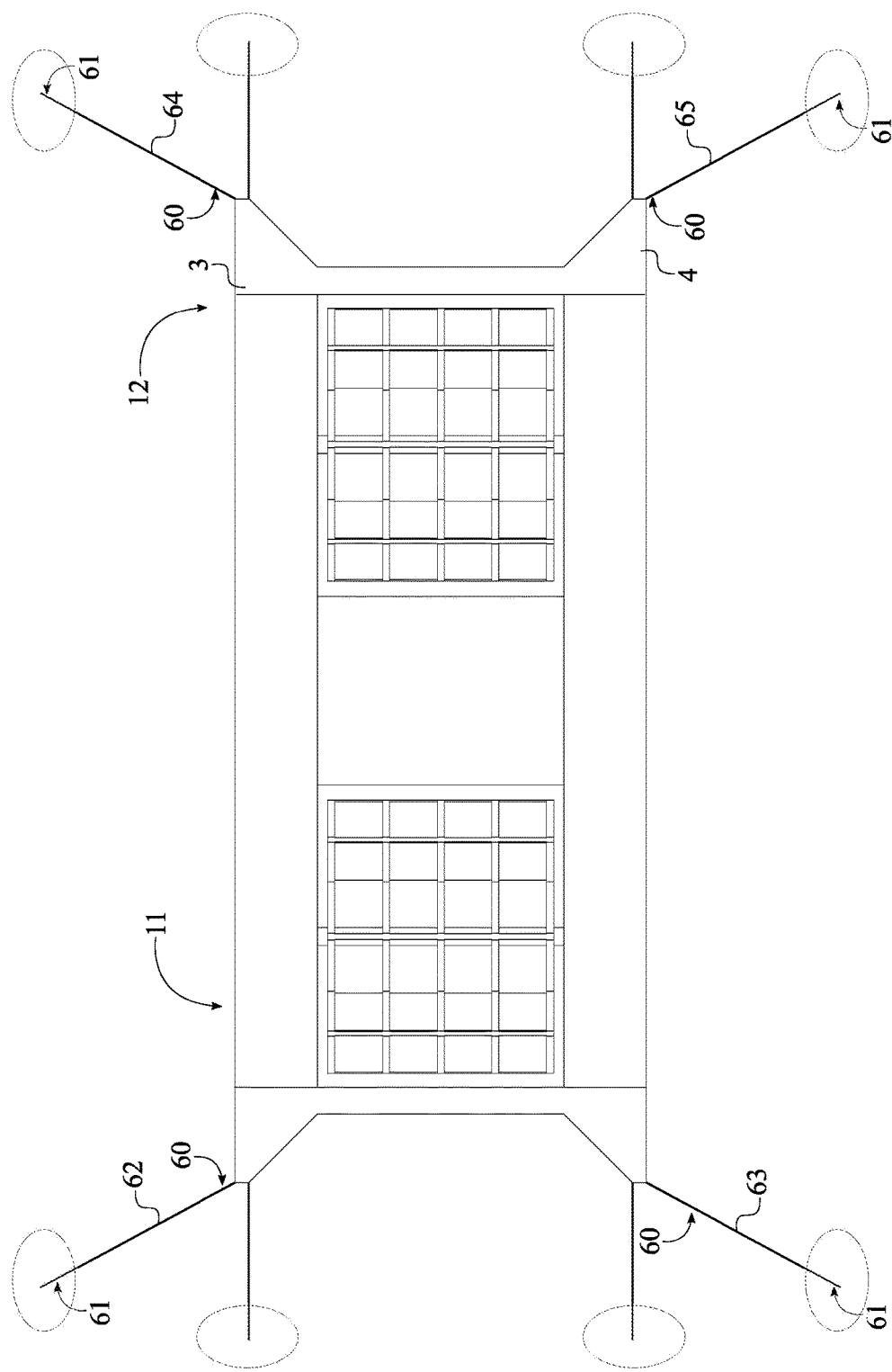
FIG. 18 is a top view of the present invention, showing the spread mooring system.

The present invention can utilize a spread mooring system as the anti-drift mooring system 57 that comprises a first port-side spread mooring leg 62, a first starboard-side spread mooring leg 63, a second port-side spread mooring leg 64, and a second starboard-side spread mooring leg 65 as shown in FIG. 18. More specifically, a top end 60 of the first port-side spread mooring leg 62 is connected to the first end 11 of the port-side section 3. A top end 60 of the first starboard-side spread mooring leg 63 is connected to the first end 11 of the starboard-side section 4. A top end 60 of the second port-side spread mooring leg 64 is connected to the second end 12 of the port-side section 3. A top end 60 of the second starboard-side spread mooring leg 65 is connected to the second end 12 of the starboard-side section 4. A bottom end 61 of the first port-side spread mooring leg 62, the first starboard-side spread mooring leg 63, the second port-side spread mooring leg 64, and the second starboard-side spread mooring leg 65 are connected to the subsurface environment 80 thus securing the floating hull 1. Since the spread mooring system secures the floating hull 1 in four different direction, the floating hull 1 is able to maintain a stationary position with respect to the water surface.

Figure 19:
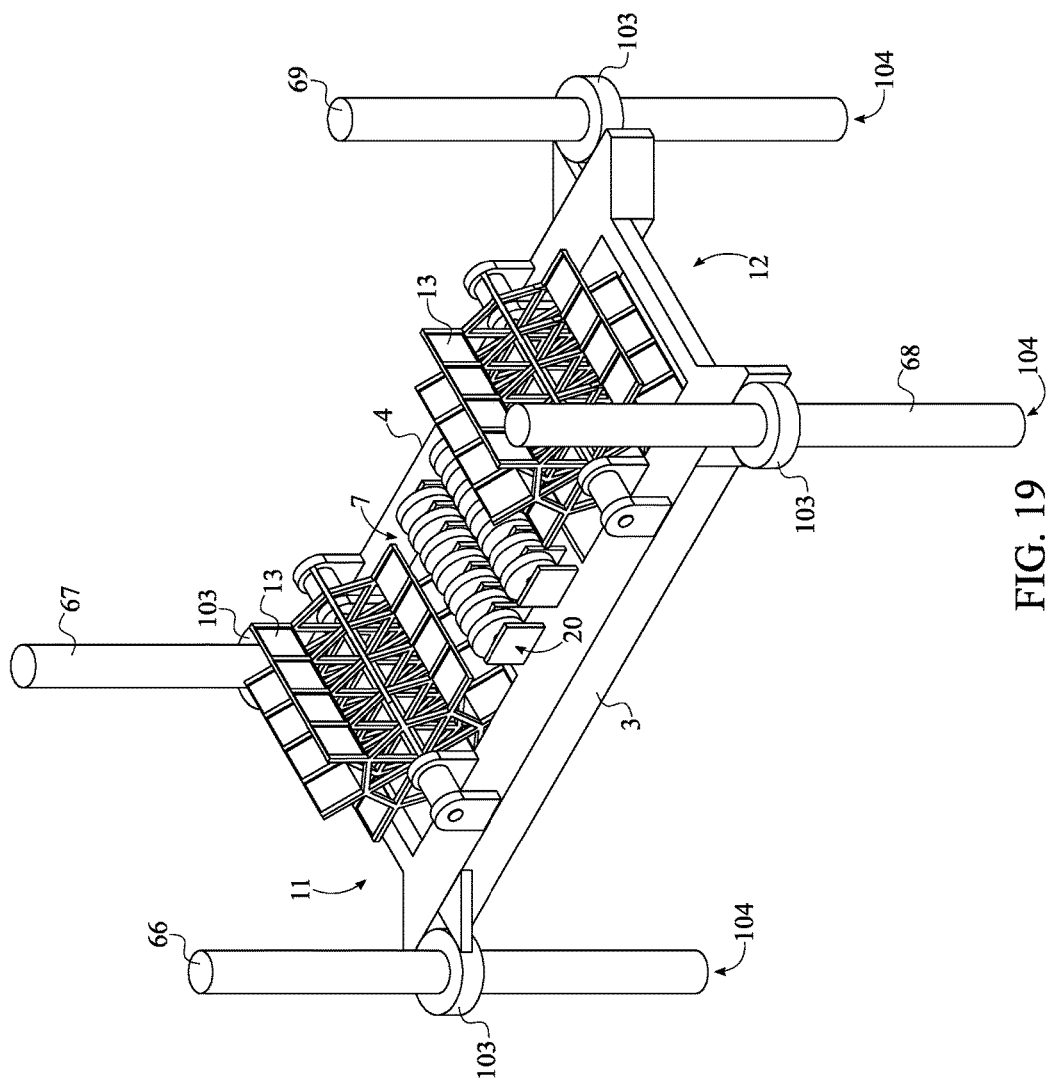
FIG. 19 is a perspective view of the present invention, showing the dolphin mooring system.

The present invention can utilize a dolphin mooring system as the anti-drift mooring system 57 that comprises a first port-side dolphin mooring leg 66, a first starboard-side dolphin mooring leg 67, a second port-side dolphin mooring leg 68, and a second starboard-side dolphin mooring leg 69 as shown in FIG. 19. More specifically, a lateral bumper 103 of the first port-side dolphin mooring leg 66 is connected to the first end 11 of the port-side section 3. A lateral bumper 103 of the first starboard-side dolphin mooring leg 67 is pressed against the first end 11 of the starboard-side section 4. A lateral bumper 103 of the second port-side dolphin mooring leg 68 is pressed against the second end 12 of the port-side section 3. A lateral bumper 103 of the second starboard-side dolphin mooring leg 69 is pressed against the second end 12 of the starboard-side section 4. An anchoring end 104 of the first port-side dolphin mooring leg 66, the first starboard-side dolphin mooring leg 67, the second port-side dolphin mooring leg 68, and the second starboard-side dolphin mooring leg 69 are connected to the subsurface environment 80 thus securing the floating hull 1. Since the dolphin mooring system secures the floating hull 1 in four different direction, the floating hull 1 is able to maintain a stationary position with respect to the water surface. Moreover, the dolphin mooring system is probably the lowest-cost option for the anti-drift mooring system 57. The dolphin mooring system is ideal in the relatively shallow tidal estuaries where these current catcher pontoon barges will most likely be used and where the tidal currents change 180 degrees between tides. The mooring dolphin legs are also ideal since the dolphin mooring legs are as close as possible to the hull minimizing bending moments on a hull's structure. In addition, the dolphin mooring legs allow barges to be placed very close together.

Figure 20:
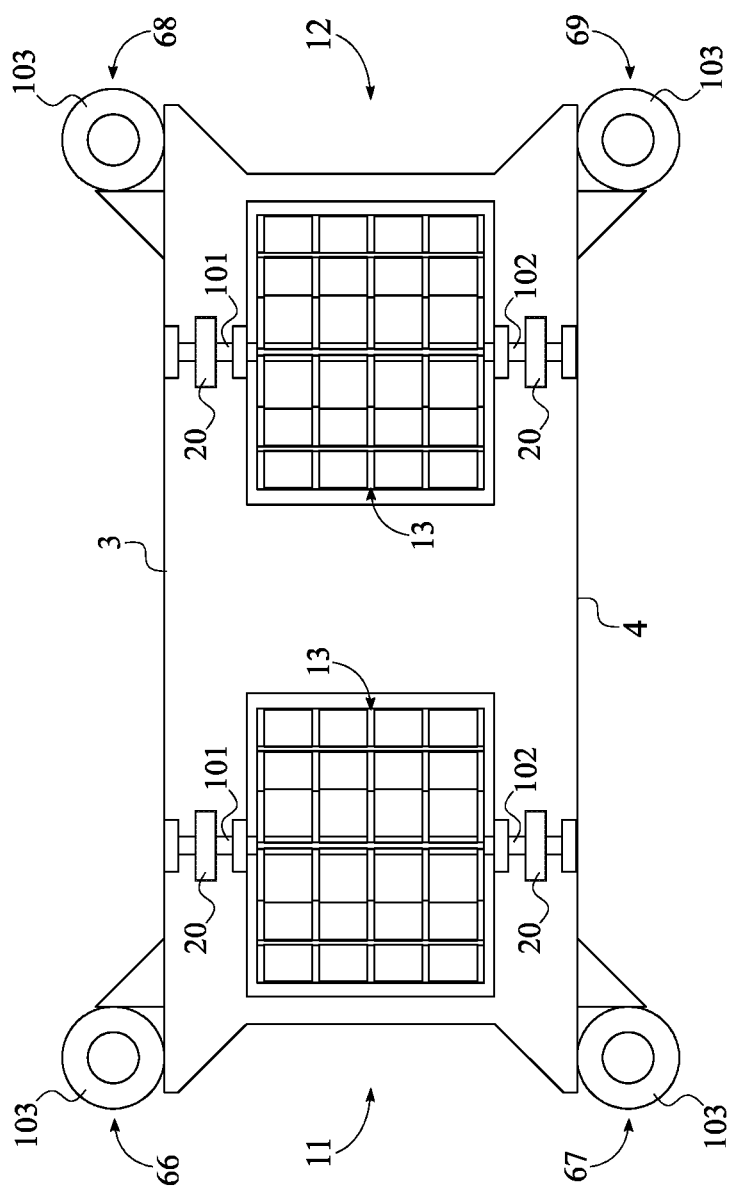
FIG. 20 is a top view of the present invention, showing the dolphin mooring system, the first direct driveshaft, and the second direct driveshaft.

In reference to a fifth embodiment of the present invention, the torque transmission system 32 comprises a first direct driveshaft 101, a second direct driveshaft 102, or a combination thereof, which are illustrated in FIG. 20. The first direct driveshaft 101 is positioned adjacent to the port-side section 3 and is used as a direct means of torsionally connecting the main axle 14 for the at least one paddle wheel assembly 13 to the at least one generator assembly 13. Similarly, the second direct driveshaft 102 is positioned adjacent to the starboard-side section 4 and is used as a direct means of torsionally connecting the main axle 14 for the at least one paddle wheel assembly 13 to the at least one generator assembly 13. The at least one generator assembly 13 is positioned atop the top section for the fifth embodiment of the present invention. Moreover, the fifth embodiment of the present invention preferably uses a single generator for each direct driveshaft so that the fifth embodiment of the present invention is simple, low cost, and low risk option with minimum mechanical components.

Another feature of the present invention may be a power transmission system that is able to send the hydroelectric power generated by the present invention to an external location. The power transmission system can be power cables or any other means of exporting a large quantity of electricity over a long distance. Alternatively, the present invention may have a portable power storage unit (e.g. a battery) that is able to retain the hydroelectric power generated by the present invention, until the hydroelectric power can be properly exported to an external location at some later time.

Some primary features of the present invention allow the present invention to efficiently and effectively generate hydroelectric power by floating upon a water's surface. One such primary feature is that the present invention has a minimum drag force on the floating hull 1. Another such primary feature is that the at least one paddlewheel assembly 13 is supported by the floating hull 1. Another such primary feature is that the at least on paddle wheel assembly 13 is able to directly or indirectly transfer torque to the at least one generator assembly 20. In order to generate the most torque from the at least one paddlewheel assembly 13, the present invention need to maximize the radial distance of each of the plurality of paddle boards 15 about the main axle 14. Also, in order to generate the most torque from the at least one paddlewheel assembly 13, the present invention needs to maximize the length, the width, and the drag coefficient of each paddle blade 17. Another such primary feature is that the present invention is configured to have at least two paddle blades 7 in contact with the water's surface at all times insuring continuous rotation of the at least one paddle wheel assembly 13. Another such primary feature is that the present invention is configured to have the plurality of paddle boards 15 in full contact with the high-velocity surface current at their maximum draft. Another such primary feature is that the anti-drift mooring system 57 is configured to keep the floating hull 1 in a desired horizontal location while allowing for free vertical movement of the floating hull 1 as the water's surface changes elevation.

Some secondary features of the present invention allow the present invention to efficiently and effectively generate hydroelectric power by floating upon a water's surface. These secondary features are as follows:

The plurality of paddle boards 15 is fully submerged at their maximum draft position creating the most torque on the main axle 14. When a paddle blade 17 is in its most submerged position, the support frame 16 extends from near the water's surface to the most extreme outside diameter of the at least one paddle wheel assembly 13.

The present invention maintains a near constant draft so as the water's surface changes elevation the plurality of paddle boards 15 remains at their optimum draft at all times for maximum power generation.

The floating hull 1 has the buoyancy required to support its own weight plus the weight of all equipment inside and on top of the floating hull 1 including the weight of the at least one paddle wheel assembly 13.

The floating hull 1 is designed to divert current to the area between the port-side section 3 and the starboard-side section 4 increasing the current velocity on the plurality of paddle boards 15.

The port-side section 3 and the starboard-side section 4 confine some of the current pressure on the plurality of paddle boards 15 that would otherwise be relieved out the open ends of the at least one paddle wheel assembly 13.

The gap between the ends of the paddle boards 15 and the port-side section 3 or the starboard-side section 4 is kept to a minimum in order to maximize current pressure on the plurality of paddle boards 15 and in turn to maximize the current forces on the paddle blade 17.

The paddle boards 15 are designed to have high drag coefficients of 1.0 or higher, which further maximizes the current forces on the plurality of paddle boards 15 and maximizing torque on the main axle 14.

The plurality of paddle boards 15 collects mechanical power from the highest velocity currents which are usually located at the water's surface maximizing current forces on the paddle boards 15. Current force is linearly proportional to current velocity squared. Thus, a 2 meter/second current imposes 4 times (2 meters/second)$^2$ the force on the paddle blade 17 as a 1 meter/second current (1 meters/second)$^2$.

The wider spacing between the port-side section 3 and the starboard-side section 4 allows for more current to be converted to electrical power.

The anti-drift mooring system 57 can allow the floating hull 1 to weathervane into the prevailing current or have a fixed heading.

If the barge has a fixed heading in a tidal location, the at least one paddle wheel assembly 13 will reverse rotation when the tide changes direction. Consequently, a gear change needs to occur when the tidal flow changes direction, which can be accomplished in many ways by those familiar with the art.

The dolphin mooring legs can optionally be used to support bridges.

The bridges between the dolphin mooring legs can optionally support personnel, road traffic, power cables, control cables, maintenance personnel, maintenance equipment, etc.

Dolphin mooring legs (also known as piles/caissons) can be located internally or externally to the floating hull 1 with potential current load changes base of a dolphin mooring leg's location and will result in changes to the installation cost.

The floating hull 1 could transport its own dolphin mooring legs especially if the dolphin mooring legs are buoyant suction piles or buoyant suction caissons. After the present invention is floated to its installation location, its buoyant suction piles or buoyant suction caissons can be lowered to the bottom by slowly releasing air from the piles or caissons. Once on the bottom, the suction piles or suction caissons can be sucked into the bottom without the need to mobilize any other installation vessel.

The present invention using a dolphin mooring system can optionally be moored adjacent to an existing or new bridge allowing the bridge to be used for export-power-cable support, control-cable support, maintenance-personnel access, maintenance-equipment support, etc. while placing no additional load on the bridge.

The present invention has very low fabrication costs since the entire invention can be fabricated, equipped, tested and fully commissioned under ideal conditions in an existing shipyard or offshore platform fabrication yard ready for operation.

The present invention has low transportation and installation costs since the entire invention is floated to its installation location and is connected to its pre-installed mooring system and its pre-installed export-power cables in about a day, which allows the present invention to be ready for immediate power generation.

The present invention can be designed with retractable paddle boards enabling them to be transported with minimum drag through very shallow water to their final installation site. This minimum drag configuration will be very helpful in the final installation process and possibly during future repair and maintenance operations enabling the at least one paddle wheel assembly 13 to be completely stopped.

A single unit of the present invention can be installed on its own with one flexible export power cable or with many other units of the present invention with many flexible export power cables.

Multiple units of the present invention can also be installed in configurations which optimizes power generation, minimizes shadowing and eliminates possible interference between other barges and other objects.

Multiple units of the present invention can be installed in a configuration which allows bridge support between those multiple units.

Multiple units of the present invention using dolphin mooring systems can be installed in a configuration which allows bridge support between dolphin mooring legs.

Multiple units of the present invention can be installed in any combination. For example, those multiple units can be installed in the highest current locations and use the infrastructure or ordinary bridges at their ends in the low current shallow water locations.

Estuary bridges often have rock lined berms at their shallow water ends. These berms divert the shallow water estuary tidal currents to the deeper middle sections of the bridges further increasing the tidal current velocity in the deeper middle sections.

The present invention can use many types of generators including, but not limited to, low, medium, and high revolutions per minute (RPM) generators.

The at least one paddle wheel assembly 13 can optionally be enclosed, though heavier and more expensive, the enclosure may allow advantages including appearance advantages allowing faster permit approvals.

The present invention has available space for most equipment maintenance on the floating hull 1 without the need to remove the present invention from its location.

The present invention has space for transformers on the floating hull 1 to be able to export the power at desired voltages minimizing cable sizes and minimizing power transmission losses.

The present invention is a minimum risk to ship navigation because the present invention is very visible both during the day and during the night. The present invention has no hidden underwater parts to avoid (e.g. the rotors of underwater tidal turbines). Moreover, the gaps between multiple units of the present invention can be reliably maintained to allow continuous and safe river and estuary traffic.

The at least one paddle wheel assembly 13 is turned by the current, turned in the direction of the current, turned at the speed of the current, and only operate at the surface minimizing risk to aquatic life. Gaps between multiple units of the present invention allow the free safe movement of aquatic life between those multiple units.

Gaps between the bottom of the paddle boards 15 and the river and estuary beds allow the free and safe movement of aquatic life under the barges. The at least one paddle wheel assembly 13 is at far less risk to aquatic life than ship propellers, submerged turbine generator rotors, etc.

The present invention is a low risk project because the present invention uses proven existing components including: steel barge hulls, wind generators, pile, caissons, wire rope moorings, etc.

The present invention is also a low risk project because the present invention uses simple proven existing installation methods that work well, reliably and quickly in high velocity current locations.

Although the invention has been explained in relation to its preferred embodiment, it is to be understood that many other possible modifications and variations can be made without departing from the spirit and scope of the invention as hereinafter claimed.

What is claimed is:

1. A hydroelectricity generating unit capturing marine current energy comprises:
   a floating hull;
   at least one paddle wheel assembly;
   at least one generator assembly;
   a torque transmission system;
   an anti-drift mooring system;
   the floating hull comprises a port-side section, a starboard-side section, and a top section;
   the port-side section and the starboard-side section being connected parallel to each other by the top section;

a bow end of the port-side section and a bow end of the starboard-side section being positioned coplanar to each other;
a stern end of the port-side section and a stern end of the starboard-side section being positioned coplanar to each other;
the at least one paddle wheel assembly being rotatably mounted to the port-side section and the starboard-side section;
the at least one paddle wheel assembly being positioned in between the top section, the port-side section, and the starboard-side section;
the at least one generator assembly being mounted onto a top surface of floating hull;
the at least one paddle wheel assembly being operatively coupled with the at least one generator assembly by the torque transmission system, wherein a kinetic energy of the at least one paddle wheel assembly is transferred to the at least one generator assembly by the torque transmission system to generate hydroelectricity; and
the floating hull being tensionably coupled to a subsurface environment by the anti-drift mooring system.

2. The hydroelectricity generating unit capturing marine current energy as claimed in claim 1 comprises:
the floating hull further comprises a bow opening, a stern opening, and an enclosure;
the bow opening being delineated within the bow end of the port-side section and the bow end of the starboard-side section;
the stern opening being delineated within the stern end of the port-side section and the stern end of the starboard-side section;
the enclosure being perimetrically positioned around the top section; and
the enclosure being hermetically connected to the top section.

3. The hydroelectricity generating unit capturing marine current energy as claimed in claim 1 comprises:
the at least one paddle wheel assembly comprises a main axle and a plurality of paddle boards;
the plurality of paddle boards being connected along the main axle;
the plurality of paddle boards being radially distributed around the main axle;
the plurality of paddle boards being equally spaced apart from each other; and
the main axle being rotatably mounted to the port-side section and the starboard-side section.

4. The hydroelectricity generating unit capturing marine current energy as claimed in claim 3 comprises:
each of the plurality of paddle boards comprises a support frame and a paddle blade;
the support frame being laterally connected to the main axle; and
the paddle blade being slidably connected to the support frame.

5. The hydroelectricity generating unit capturing marine current energy as claimed in claim 1 comprises:
the at least one generator assembly comprises a first generator, a plurality of intermediate generators, a second generator, a first connector axle, and a second connector axle;
a stator of the first generator, the plurality of intermediate generators, and the second generator being connected to the top surface;
a rotor of the first generator, the plurality of intermediate generators, and the second generator being axially connected to each other;
the first connector axle being axially connected to the rotor of the first generator, opposite of the plurality of intermediate generators;
the second connector axle being axially connected to the rotor of the second generator, opposite of the plurality of intermediate generators; and
the first connector axle and the second connector axle being mounted onto the top surface of floating hull.

6. The hydroelectricity generating unit capturing marine current energy as claimed in claim 1 comprises:
the torque transmission system comprises a port-side hydraulic drive motor, a starboard-side hydraulic drive motor, a supply line, and a return line;
the at least one generator assembly comprises a first generator, a plurality of intermediate generators, and a second generator;
a main axle for the at least one paddle wheel assembly being torsionally connected to the port-side hydraulic drive motor, adjacent to the port-side section;
the main axle for the at least one paddle wheel assembly being torsionally connected to the starboard-side hydraulic drive motor, adjacent to the starboard-side section;
the port-side hydraulic drive motor and the starboard-side hydraulic drive motor being in fluid communication with a rotor of the first generator, the plurality of intermediate generators, and the second generator through the supply line;
the port-side hydraulic drive motor and the starboard-side hydraulic drive motor being in fluid communication with the rotor of the first generator, the plurality of intermediate generators, and the second generator through the return line; and
the at least one generator assembly being positioned atop the top section.

7. The hydroelectricity generating unit capturing marine current energy as claimed in claim 6, wherein the first generator, the plurality of intermediate generators, and the second generator are positioned within an enclosure of the floating hull.

8. The hydroelectricity generating unit capturing marine current energy as claimed in claim 6 comprises:
the floating hull further comprises a first end and a second end;
the at least one paddle wheel assembly being a single wheel assembly;
the at least one generator assembly being a single row of generators;
the first end and the second end being adjacently positioned with each other;
the port-side hydraulic drive motor and the starboard-side hydraulic drive motor being positioned adjacent to the first end;
the single wheel assembly being positioned adjacent to the first end;
the single row of generators being positioned adjacent to the first end; and
the anti-drift mooring system being rotatably connected to the second end.

9. The hydroelectricity generating unit capturing marine current energy as claimed in claim 6 comprises:
the floating hull further comprises a first end and a second end;

the at least one paddle wheel assembly being a first wheel assembly and a second wheel assembly;
the at least one generator assembly being a first row of generators and a second row of generators;
the first end and the second end being adjacently positioned with each other;
the port-side hydraulic drive motor and the starboard-side hydraulic drive motor for the first wheel assembly being positioned adjacent to the first end;
the first wheel assembly being positioned adjacent to the first end;
the first row of generators being positioned adjacent to the first end;
the port-side hydraulic drive motor and the starboard-side hydraulic drive motor for the second wheel assembly being positioned adjacent to the second end;
the second wheel assembly being positioned adjacent to the second end;
the second row of generators being positioned adjacent to the second end; and
the anti-drift mooring system being connected to the first end and second end.

10. The hydroelectricity generating unit capturing marine current energy as claimed in claim 1 comprises:
the torque transmission system comprises a port-side driver pulley, a port-side driven pulley, a port-side belt, a starboard-side driver pulley, a starboard-side driven pulley, and a starboard-side belt;
the at least one generator assembly comprises a first connector axle and a second connector axle;
a main axle for the at least one paddle wheel assembly being torsionally connected to the port-side driver pulley, adjacent to the port-side section;
the main axle for the at least one paddle wheel assembly being torsionally connected to the starboard-side driver pulley, adjacent to the starboard-side section;
the first connector axle being torsionally connected to the port-side driven pulley, adjacent to the port-side section;
the second connector axle being torsionally connected to the starboard-side driven pulley, adjacent to the starboard-side section;
the port-side belt being tensionably engaged about the port-side driver pulley and the port-side driven pulley;
the starboard-side belt being tensionably engaged about the starboard-side driver pulley and the starboard-side driven pulley; and
the at least one generator assembly being positioned atop the top section.

11. The hydroelectricity generating unit capturing marine current energy as claimed in claim 10, wherein the at least one generator assembly is positioned within an enclosure of the floating hull.

12. The hydroelectricity generating unit capturing marine current energy as claimed in claim 10 comprises:
the floating hull further comprises a first end and a second end;
the at least one paddle wheel assembly being a single wheel assembly;
the at least one generator assembly further being a single row of generators;
the first end and the second end being adjacently positioned with each other;
the port-side driver pulley, the port-side driven pulley, the port-side belt, the starboard-side driver pulley, the starboard-side driven pulley, and the starboard-side belt being positioned adjacent to the first end;
the single wheel assembly being positioned adjacent to the first end;
the single row of generators being positioned adjacent to the first end; and
the anti-drift mooring system being rotatably connected to the second end.

13. The hydroelectricity generating unit capturing marine current energy as claimed in claim 10 comprises:
the floating hull further comprises a first end and a second end;
the at least one paddle wheel assembly being a first wheel assembly and a second wheel assembly;
the at least one generator assembly being a first row of generators and a row of generators;
the first end and the second end being adjacently positioned with each other;
the port-side driver pulley, the port-side driven pulley, the port-side belt, the starboard-side driver pulley, the starboard-side driven pulley, and the starboard-side belt for the first wheel assembly being positioned adjacent to the first end;
the first wheel assembly being positioned adjacent to the first end;
the first row of generators being positioned adjacent to the first end;
the port-side driver pulley, the port-side driven pulley, the port-side belt, the starboard-side driver pulley, the starboard-side driven pulley, and the starboard-side belt for the second wheel assembly being positioned adjacent to the second end;
the second wheel assembly being positioned adjacent to the second end;
the second row of generators being positioned adjacent to the second end; and
the anti-drift mooring system being connected to the first end and second end.

14. The hydroelectricity generating unit capturing marine current energy as claimed in claim 1 comprises:
the torque transmission system comprises a port-side driver gearbox, a port-side driven gearbox, a port-side drive axle, a starboard-side driver gearbox, a starboard-side driven gearbox, and a starboard-side drive axle;
the at least one generator assembly comprises a first connector axle and a second connector axle;
a main axle for the at least one paddle wheel assembly being torsionally connected to an input gear of the port-side driver gearbox, adjacent to the port-side section;
the main axle for the at least one paddle wheel assembly being torsionally connected to an input gear of the starboard-side driver gearbox, adjacent to the starboard-side section;
the first connector axle being torsionally connected to an input gear of the port-side driven gearbox, adjacent to the port-side section;
the second connector axle being torsionally connected to an input gear of the starboard-side driven gearbox, adjacent to the starboard-side section;
the port-side drive axle being torsionally connected to an output gear of the port-side driver gearbox and an output gear of the port-side driven gearbox;
the starboard-side drive axle being torsionally connected to an output gear of the starboard-side driver gearbox and an output gear of the starboard-side driven gearbox; and
the at least one generator assembly being positioned atop the top section.

15. The hydroelectricity generating unit capturing marine current energy as claimed in claim 14, wherein the at least one generator assembly is positioned within an enclosure of the floating hull.

16. The hydroelectricity generating unit capturing marine current energy as claimed in claim 14 comprises:
the floating hull further comprises a first end and a second end;
the at least one paddle wheel assembly being a single wheel assembly;
the at least one generator assembly further being a single row of generators;
the first end and the second end being adjacently positioned with each other;
the port-side driver gearbox, the port-side driven gearbox, the port-side drive axle, the starboard-side driver gearbox, the starboard-side driven gearbox, and the starboard-side drive axle being positioned adjacent to the first end;
the single wheel assembly being positioned adjacent to the first end;
the single row of generators being positioned adjacent to the first end; and
the anti-drift mooring system being rotatably connected to the second end.

17. The hydroelectricity generating unit capturing marine current energy as claimed in claim 14 comprises:
the floating hull further comprises a first end and a second end;
the at least one paddle wheel assembly being a first wheel assembly and a second wheel assembly;
the at least one generator assembly being a first row of generators and a second row of generators;
the first end and the second end being adjacently positioned with each other;
the port-side driver gearbox, the port-side driven gearbox, the port-side drive axle, the starboard-side driver gearbox, the starboard-side driven gearbox, and the starboard-side drive axle for the first wheel assembly being positioned adjacent to the first end;
the first wheel assembly being positioned adjacent to the first end;
the first row of generators being positioned adjacent to the first end;
the port-side driver gearbox, the port-side driven gearbox, the port-side drive axle, the starboard-side driver gearbox, the starboard-side driven gearbox, and the starboard-side drive axle for the second wheel assembly being positioned adjacent to the second end;
the second wheel assembly being positioned adjacent to the second end;
the second row of generators being positioned adjacent to the second end; and
the anti-drift mooring system being connected to the first end and second end.

18. The hydroelectricity generating unit capturing marine current energy as claimed in claim 1 comprises:
the torque transmission system comprises a first port-side gearbox, a second port-side gearbox, a first starboard-side gearbox, and a second starboard-side gearbox;
the at least one generator assembly comprises a linear set of port-side generators and a linear set of starboard-side generators;
a main axle for the at least one paddle wheel assembly being torsionally connected to an input gear of the first port-side gearbox, adjacent to the port-side section;
the main axle for the at least one paddle wheel assembly being torsionally connected to an input gear of the first starboard-side gearbox, adjacent to the starboard-side section;
the linear set of port-side generators being positioned along the port-side section;
the linear set of starboard-side generators being positioned along the starboard-side section;
the first connector axle of the linear set of port-side generators being torsionally connected to an output gear of the first port-side gearbox;
the second connector axle of the linear set of port-side generators being torsionally connected to an output gear of the second port-side gearbox;
the first connector axle of the linear set of starboard-side generators being torsionally connected an output gear of the first starboard-side gearbox; and
the second connector axle of the linear set of starboard-side generators being torsionally connected to an output gear of the second starboard-side gearbox.

19. The hydroelectricity generating unit capturing marine current energy as claimed in claim 18 comprises:
a port-side enclosure;
a starboard-side enclosure;
the port-side enclosure being perimetrically positioned around the port-side section;
the port-side enclosure being hermetically connected to the port-side section;
the starboard-side enclosure being perimetrically positioned around the starboard-side section;
the starboard-side enclosure being hermetically connected to the starboard-side section;
the linear set of port-side generators being positioned within the port-side enclosure; and
the linear set of starboard-side generators being positioned within the starboard-side enclosure.

20. The hydroelectricity generating unit capturing marine current energy as claimed in claim 18 comprises:
the floating hull further comprises a first end and a second end;
the at least one paddle wheel assembly being a single wheel assembly;
the first end and the second end being adjacently positioned with each other;
the first port-side gearbox and the first starboard-side gearbox being positioned adjacent to the first end;
the second port-side gearbox and the second starboard-side gearbox being positioned adjacent to the second end;
the single wheel assembly being positioned adjacent to the first end; and
the anti-drift mooring system being rotatably connected to the second end.

21. The hydroelectricity generating unit capturing marine current energy as claimed in claim 18 comprises:
the floating hull further comprises a first end and a second end;
the at least one paddle wheel assembly being a first wheel assembly and a second wheel assembly;
the first end and the second end being adjacently positioned with each other;
the first wheel assembly being positioned adjacent to the first end;
the first port-side gearbox and the first starboard-side gearbox for the first wheel assembly being positioned adjacent to the first end;

the second wheel assembly being positioned adjacent to the second end;

the second port-side gearbox and the second starboard-side gearbox for the first wheel assembly being positioned adjacent to the second end; and the anti-drift mooring system being connected to the first end and second end.

22. The hydroelectricity generating unit capturing marine current energy as claimed in claim 1 comprises:

the anti-drift mooring system comprises a turret and a plurality of mooring lines;

the at least one generator assembly being positioned adjacent to a first end of the floating hull;

the turret being rotatably connected to a second end of the floating hull;

a top end of the plurality of mooring lines being connected to the turret; and a bottom end of the plurality of mooring lines being connected to the subsurface environment.

23. The hydroelectricity generating unit capturing marine current energy as claimed in claim 1 comprises:

the anti-drift mooring system comprises a first port-side spread mooring leg, a first starboard-side spread mooring leg, a second port-side spread mooring leg, and a second starboard-side spread mooring leg;

a top end of the first port-side spread mooring leg being connected to a first end of the port-side section;

a top end of the first starboard-side spread mooring leg being connected to a first end of the starboard-side section;

a top end of the second port-side spread mooring leg being connected to a second end of the port-side section;

a top end of the second starboard-side spread mooring leg being connected to a second end of the starboard-side section; and a bottom end of the first port-side spread mooring leg, the first starboard-side spread mooring leg, the second port-side spread mooring leg, and the second starboard-side spread mooring leg being connected to the subsurface environment.

24. The hydroelectricity generating unit capturing marine current energy as claimed in claim 1 comprises:

the anti-drift mooring system comprises a first port-side dolphin mooring leg, a first starboard-side dolphin mooring leg, a second port-side dolphin mooring leg, and a second starboard-side dolphin mooring leg;

a lateral bumper of the first port-side dolphin mooring leg being pressed against a first end of the port-side section;

a lateral bumper of the first starboard-side dolphin mooring leg being pressed against a first end of the starboard-side section;

a lateral bumper of the second port-side dolphin mooring leg being pressed against a second end of the port-side section;

a lateral bumper of the second starboard-side dolphin mooring leg being pressed against a second end of the starboard-side section; and an anchoring end of the first port-side dolphin mooring leg, the first starboard-side dolphin mooring leg, the second port-side dolphin mooring leg, and the second starboard-side dolphin mooring leg being connected to the subsurface environment.

25. The hydroelectricity generating unit capturing marine current energy as claimed in claim 1 comprises:

the torque transmission system comprises a first direct driveshaft;

the first direct driveshaft being positioned adjacent to the port-side section;

a main axle for the at least one paddle wheel assembly being torsionally connected to the at least one generator assembly by the first direct driveshaft; and the at least one generator assembly being positioned atop the top section.

26. The hydroelectricity generating unit capturing marine current energy as claimed in claim 1 comprises:

the torque transmission system comprises a second direct driveshaft;

the second direct driveshaft being positioned adjacent to the starboard-side section;

a main axle for the at least one paddle wheel assembly being torsionally connected to the at least one generator assembly by the second direct driveshaft; and the at least one generator assembly being positioned atop the top section.

\* \* \* \* \*